US012579125B2

(12) United States Patent
Bhola

(10) Patent No.: US 12,579,125 B2
(45) Date of Patent: Mar. 17, 2026

(54) SYSTEMS AND METHODS FOR ADMISSION CONTROL INPUT/OUTPUT

(71) Applicant: Cockroach Labs, Inc., New York, NY (US)

(72) Inventor: Sumeer Kumar Bhola, Brooklyn, NY (US)

(73) Assignee: Cockroach Labs, Inc., New York, NY (US)

( * ) Notice: Subject to any disclaimer, the term of this patent is extended or adjusted under 35 U.S.C. 154(b) by 0 days.

(21) Appl. No.: 18/320,671

(22) Filed: May 19, 2023

(65) Prior Publication Data

US 2023/0376476 A1 Nov. 23, 2023

Related U.S. Application Data

(60) Provisional application No. 63/344,404, filed on May 20, 2022.

(51) Int. Cl.
*G06F 16/23* (2019.01)
*G06F 16/22* (2019.01)

(52) U.S. Cl.
CPC ...... *G06F 16/2322* (2019.01); *G06F 16/2246* (2019.01); *G06F 16/2282* (2019.01)

(58) Field of Classification Search
CPC ............. G06F 16/2322; G06F 16/2246; G06F 16/2282
USPC ........................................................ 707/703
See application file for complete search history.

(56) References Cited

U.S. PATENT DOCUMENTS

| | | | | | |
|---|---|---|---|---|---|
| 11,550,479 | B1 * | 1/2023 | Shatsky | ................ | G06F 3/0613 |
| 11,675,789 | B2 * | 6/2023 | Shatsky | .............. | G06F 16/2246 |
| | | | | | 707/609 |
| 2013/0346436 | A1 * | 12/2013 | Kraft | ................... | G06F 11/3409 |
| | | | | | 707/769 |
| 2017/0364414 | A1 * | 12/2017 | Pogosyan | ........... | G06F 16/9027 |
| 2018/0349095 | A1 * | 12/2018 | Wu | ....................... | G06F 3/0643 |
| 2019/0042098 | A1 * | 2/2019 | Li | ......................... | G06F 3/0644 |
| 2020/0201822 | A1 * | 6/2020 | Wang | ...................... | G06F 16/17 |
| 2020/0250148 | A1 * | 8/2020 | Dayan | ....................... | G06F 7/14 |
| 2021/0132869 | A1 * | 5/2021 | Tian | ....................... | G06F 3/0649 |
| 2021/0342259 | A1 * | 11/2021 | Idreos | ................ | G06F 16/2272 |
| 2021/0397345 | A1 * | 12/2021 | Jawahar | .............. | G06F 9/45558 |
| 2022/0067004 | A1 * | 3/2022 | Agrawal | ............. | G06F 16/2246 |
| 2022/0156231 | A1 * | 5/2022 | Wang | .................. | G06F 16/9027 |
| 2022/0188317 | A1 * | 6/2022 | Fanghaenel | ............. | G06F 16/86 |
| 2022/0247812 | A1 * | 8/2022 | Mehta | ................. | H04L 67/1031 |

(Continued)

*Primary Examiner* — Amy Ng
*Assistant Examiner* — Antonio J Caiado
(74) *Attorney, Agent, or Firm* — Goodwin Procter LLP

(57) ABSTRACT

Systems and methods for controlling admission of transactional operations for execution are provided. An admission queue configured to control admission to an LSM tree can receive a plurality of work items corresponding to a plurality of tuples. The plurality of work items can be queued in the admission queue for execution based on the plurality of tuples. Indications of a capacity of the LSM tree and a size of each work item of the plurality of work items can be determined. A plurality of tokens configured to enable admission of the plurality of work items to the LSM tree can be generated based on the indications of the capacity of the LSM tree and the size of each work item. Based on the plurality of tokens, a work item of the plurality of work items can be admitted from the admission queue to the LSM tree.

18 Claims, 9 Drawing Sheets

(56) References Cited

U.S. PATENT DOCUMENTS

| | | | |
|---|---|---|---|
| 2022/0335028 A1* | 10/2022 | Xue .................... | G06F 16/2246 |
| 2023/0141205 A1* | 5/2023 | Agrawal ............. | G06F 16/2246 |
| | | | 707/803 |
| 2023/0237035 A1* | 7/2023 | Helland ............. | G06F 16/9024 |
| | | | 707/741 |
| 2023/0244649 A1* | 8/2023 | Helland ............. | G06F 16/2272 |
| | | | 707/741 |
| 2023/0283623 A1* | 9/2023 | Borah ................ | H04L 63/0815 |
| | | | 726/5 |

* cited by examiner

700

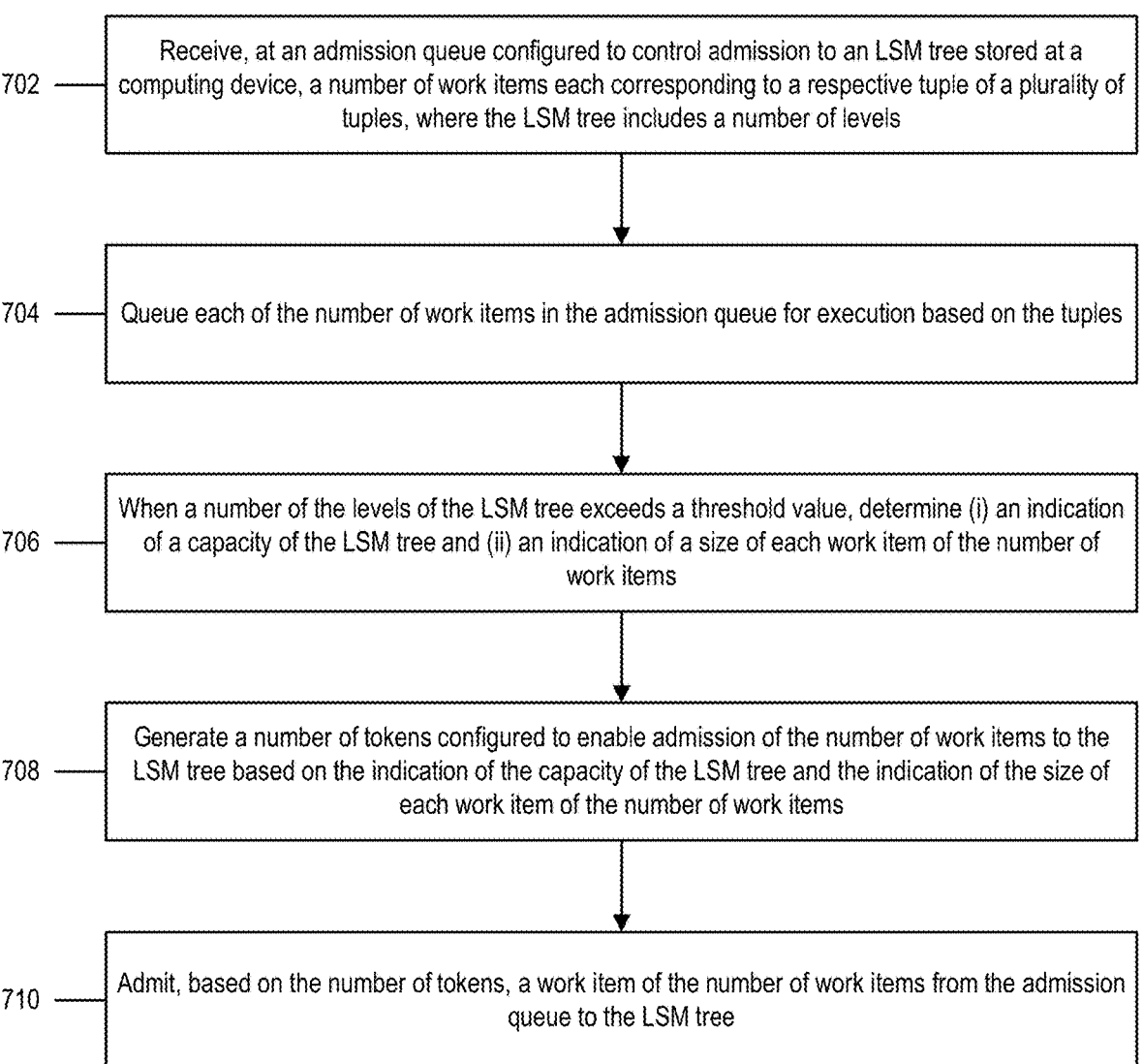

702 — Receive, at an admission queue configured to control admission to an LSM tree stored at a computing device, a number of work items each corresponding to a respective tuple of a plurality of tuples, where the LSM tree includes a number of levels 704 — Queue each of the number of work items in the admission queue for execution based on the tuples 706 — When a number of the levels of the LSM tree exceeds a threshold value, determine (i) an indication of a capacity of the LSM tree and (ii) an indication of a size of each work item of the number of work items 708 — Generate a number of tokens configured to enable admission of the number of work items to the LSM tree based on the indication of the capacity of the LSM tree and the indication of the size of each work item of the number of work items 710 — Admit, based on the number of tokens, a work item of the number of work items from the admission queue to the LSM tree

FIG. 7

SYSTEMS AND METHODS FOR ADMISSION CONTROL INPUT/OUTPUT

CROSS-REFERENCE TO RELATED APPLICATIONS

This application claims priority to and the benefit of U.S. Provisional Patent Application No. 63/344,404, filed May 20, 2022, and entitled "SYSTEMS AND METHODS FOR ADMISSION CONTROL INPUT/OUTPUT", the entirety of which is incorporated herein by reference.

FIELD OF TECHNOLOGY

The present disclosure relates generally to methods and systems for managing transactional operations within a database and more particularly, to controlling admission of transactional operations for execution at the database.

BACKGROUND

The foregoing examples of the related art and limitations therewith are intended to be illustrative and not exclusive, and are not admitted to be "prior art." Other limitations of the related art will become apparent to those of skill in the art upon a reading of the specification and a study of the drawings. In some cases, relational databases can apply replication to ensure data survivability, where data is replicated among one or more computing devices ("nodes") of a group of computing devices ("cluster"). A relational database may store data within one or more ranges, where a range includes one or more key-value (KV) pairs and can be replicated among one or more nodes of the cluster. A range may be a partition of a data table ("table"), where a table may include one or more ranges. The database may receive requests (e.g., such as read or write operations originating from client devices) directed to data and/or schema objects stored by the database.

In some cases, admission control for a system (e.g., distributed database system) can determine when work (e.g., KV operations included in transactions) submitted to that system can begin to execute. In some cases, a transaction (e.g., write transaction) directed to a system (e.g., distributed database system) may be decomposed into one or more work items directed to writing to a storage layer as described herein. As an example, an individual work item may correspond to writing a value to a single key of a replica of a range stored by a node. Admission control can be useful when resources (e.g., storage input/output (I/O) capacity) of the system become saturated or otherwise overloaded. Storage I/O as described herein may refer to I/O processes for transferring data between storage media (e.g., memory) and other computing hardware. Goals of admission control can include (i) controlling resource overload such that the overloaded resource does not degrade throughput or cause node failures for nodes included in the cluster, (ii) achieving differentiation between work items (also referred to herein as "requests") with different levels of importance submitted by users, thereby allowing certain work items to have priority over other work items, and (iii) allowing for load-balancing among data replicas (when possible) stored at nodes of the cluster. In some cases, for multi-tenant distributed database systems, admission control involves achieving fairness across tenants (e.g., where fairness is defined as equally allocating resources, e.g., storage I/O, across tenants that are competing for resources) sharing the same nodes of the cluster. Multi-tenant isolation for the shared cluster of nodes can be incorporated as a part of admission control based on queuing and re-ordering mechanisms for implementing work prioritization overlapping with mechanisms for implementing inter-tenant isolation.

In some cases, an unconstrained rate of write operations (e.g., write operations included in transactions submitted to a database) to a log-structured merge (LSM) tree-based storage system can cause the storage system to become overloaded, such that the storage system operates poorly for both write operations and read operations. An LSM tree may be a data structure stored by a non-volatile, persistent storage device. Based on admission control determining when work submitted to a system can begin to execute, admission control can control allocation of a write capacity of the LSM tree. However, conventional LSM tree-based storage systems lack support for admission control techniques.

SUMMARY

Methods and systems for controlling admission of transactional operations for execution at a database are disclosed. In one aspect, embodiments of the present disclosure feature a method for controlling admission of transactional operations. The transactional operations may include work items configured for execution at an LSM tree. According to one embodiment, the method can include receiving, at an admission queue configured to control admission to an LSM tree, a plurality of work items each corresponding to a respective tuple of a plurality of tuples, where the LSM tree comprises a plurality of levels. One or more transactions received from a client device may be decomposed into the plurality of work items. The admission queue and LSM tree may be included in a database stored by and/or otherwise operating on a computing device. The computing device may be included a network of a number of computing devices as described herein. The method can include queueing each of the plurality of work items in the admission queue for execution based on the plurality of tuples. In some cases (e.g., when a number of the levels of the LSM tree exceeds a threshold value), the method can include determining (i) an indication of a capacity of the LSM tree and (ii) an indication of a size of each work item of the plurality of work items. The method can include generating a plurality of tokens configured to enable admission of the plurality of work items to the LSM tree based on the indication of the capacity of the LSM tree and the indication of the size of each work item of the plurality of work items. The method can include admitting, based on the plurality of tokens, a work item of the plurality of work items from the admission queue to the LSM tree.

Various embodiments of the method can include one or more of the following features. The plurality of levels can include a plurality of sorted-string table (SST) files. In some cases, the plurality of levels can include one or more memory tables, where the work item is configured to write data to the one or more memory tables, and where the one or more memory tables are configured to transfer the data written by the work item to the plurality of SST files. The plurality of work items corresponds to write operations directed to key-value (KV) data stored in the LSM tree. Each tuple of the plurality of tuples can include (i) a priority indicator, (ii) a tenant identifier indicative of a tenant of one or more tenants of the data storage system that corresponds to the respective work item, and (iii) a timestamp. The queueing each of the plurality of work items in the admission queue can further include ordering each of the plurality of work items in the admission queue based on the respective priority indicator and the respective timestamp corresponding to each work item in the plurality of work items. In some cases, the one or more tenants comprise two or more tenants. In some cases, the queueing each of the plurality of work items in the admission queue can further include ordering each of the two or more tenants corresponding to the plurality of work items based on a number of previous tokens consumed by a plurality of historical work items previously admitted to the LSM tree, where the plurality of historical work items correspond to the two or more tenants; and ordering each of the plurality of work items in the admission queue based on the ordering of the two or more tenants.

In some embodiments, the number of the levels of the LSM tree are based on a number of files included in a vertical section of the LSM tree. The method can further include determining the number of the levels of the LSM tree; and comparing the number of the levels of the LSM tree to the threshold value. The determining the indication of the capacity of the LSM tree can be based on at least one of: (i) an amount of data compacted from a level of the plurality of levels of the LSM tree or (ii) an amount of data flushed from a memory table of the LSM tree. The determining the indication of the size of each work item of the plurality of work items can be based on at least one of: (i) an indication of an average amount of data corresponding to a plurality of historical work items previously admitted to the LSM tree or (ii) a size of data to be written by at least one work item of the plurality of work items. The method can further include determining a generation rate for the plurality of tokens based on the indication of the capacity of the LSM tree and the indication of the size of each work item of the plurality of work items. the generating the plurality of tokens can further include periodically generating, at the generation rate, a subset of the plurality of tokens. In some cases, the admitting the work item of the plurality of work items from the admission queue to the LSM tree can further include consuming, by the work item, at least one token of the subset of the plurality of tokens; and executing the work item by writing at least one value to a memory table of the LSM tree. The admission of the work item of the plurality of work items from the admission queue to the LSM tree can correspond to consumption of a subset of the plurality of tokens.

In another aspect, the present disclosure features a system for controlling admission of transactional operations. The transactional operations may include work items configured for execution at an LSM tree stored by the system. The system can include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of the present disclosure. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of the present disclosure.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

FIG. 7 shows a flowchart for an exemplary method for queuing and admitting work items to an LSM tree, according to some embodiments.

Figure 1:
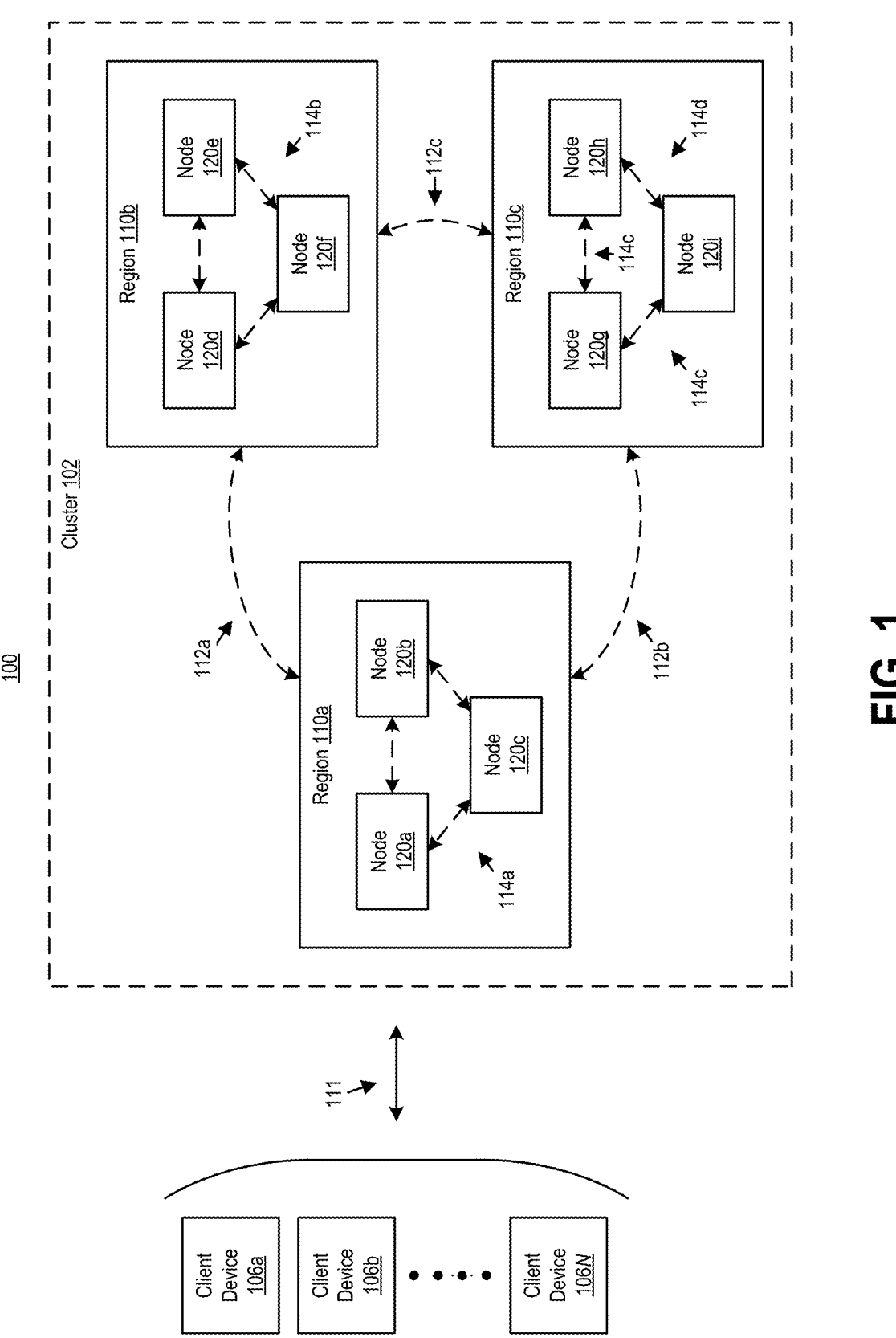
FIG. 1 ("FIG. 1") shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for controlling admission of transactional operations for execution at a database are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

As described above, admission control for a distributed database system can determine when work items (e.g., included in transactions) submitted to the system can begin to execute. Admission control can be useful when resources (e.g., storage I/O) of nodes included in the distributed database system are saturated or otherwise overloaded. Systems and methods described herein can implement node-level admission control, where central processing unit (CPU) usage and storage I/O (e.g., specifically corresponding to write operations) may be constraining resources of nodes. The focus on node-level admission control is based on an observation that large scale systems may be provisioned adequately at the aggregate level, but when such systems include stateful nodes, individual node hotspots corresponding to overload of at least one resource (e.g., CPU usage, storage I/O, memory usage, etc.) at a node can develop that can last for a period of time until rebalancing. Such hotspots should not cause node failures and/or other system failures and should not degrade system performance for important (e.g., high-priority) work items. Further, such hotspots should not unfairly degrade system performance for tenants that are not responsible for causing the hotspots to develop.

For storage I/O, a goal can be to prevent an LSM tree-based storage layer (e.g., an embedded KV store used to read and/or write data to memory of individual nodes) of the distributed database system from experiencing high read amplification, which can result when an LSM tree includes too many (e.g., greater than a threshold number of) files and/or sub-levels in a top level (e.g., level 0 (L0)) of the LSM tree stored by a particular node. Further, high read amplification can slow down read operations directed to stored data. Motivations to prevent high read amplification at the LSM tree may be balanced with motivations to maintain the LSM tree's ability to absorb bursts of write operations directed to stored data. Accordingly, high read amplification in the LSM tree can negatively impact the performance of individual nodes (e.g., included in a distributed database system).

In some embodiments, admission control for storage I/O can enable full utilization of a write capacity of an LSM tree at each node of the cluster, while also maintaining a healthy, non-overloaded LSM tree at each node. The systems and methods for admission control described herein may dynamically estimate write capacity to the LSM tree based on compaction rates and flush rates, where the dynamic estimation is agnostic to the details of the compaction and flush implementations. Compaction rates may correspond to rates at which sorted string tables (SSTs) are merged and moved from a top level (e.g., L0) of the LSM tree downward towards a bottom level (e.g., level 6 (L6)) of the LSM tree. In some cases, compaction may specifically refer to a rate at which SSTs are merged and transferred from L0 of the LSM tree to level 1 (L1) of the LSM tree. Flushing rates may refer to rates at which data from a memtable is flushed (e.g., transferred) to SSTs included in the levels (e.g., L0-L6) of the LSM tree. In some cases, flushing rates may correspond to a rate at which data from a memtable is flushed (e.g., transferred) to the top level (e.g., L0) of the LSM tree. A memtable may be an in-memory (e.g., stored by volatile memory of a node) representation of the LSM tree maintained by a storage engine of the storage layer at each node of the distributed database system. Admission control may reorder work items corresponding write operations that are queuing (e.g., waiting) for admission to the LSM tree to prioritize particular work items for admission. In a multi-tenant distributed database system, admission control may enable fair sharing of LSM resources across tenants, which can ensure performance isolation between individual tenants of the system.

Terms

"Cluster" generally refers to a deployment of computing devices that comprise a database. A cluster may include computing devices (e.g., computing nodes) that are located in one or more geographic locations (e.g., data centers). The one or more geographic locations may be located within a single geographic region (e.g., eastern United States, central United States, etc.) or more than one geographic location. For example, a cluster may include computing devices that are located in both the eastern United States and western United States, with 2 data centers in the eastern United states and 4 data centers in the western United States.

"Node" generally refers to an individual computing device that is a part of a cluster. A node may join with one or more other nodes to form a cluster. One or nodes that comprise a cluster may store data (e.g., tables, indexes, etc.) in a map of KV pairs. A node may store a "range", which can be a subset of the KV pairs (or all of the KV pairs depending on the size of the range) stored by the cluster. A range may also be referred to as a "shard" and/or a "partition". A table and its secondary indexes can be mapped to one or more ranges, where each KV pair in a range may represent a single row in the table (which can also be referred to as the primary index because the table is sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (referred to as a primary index) for the primary key column(s). A primary key may be defined for each table stored by a database as described herein. An example of a second type of index may be a secondary index. A secondary index may be defined on non-primary key columns of a table. A table that does not include a defined primary index may include a hidden row identifier (ID) column (e.g., referred to as rowid) that uniquely identifies each row of the table as an implicit primary index.

"Replica" generally refers to a copy of a range. A range may be replicated at least a threshold number of times to produce a number of replicas. For example and by default, a range may be replicated 3 times as 3 distinct replicas. Each replica of a range may be stored on a distinct node of a cluster. For example, 3 replicas of a range may each be stored on a different node of a cluster. In some cases, a range may be required to be replicated a minimum of 3 times to produce at least 3 replicas.

"Leaseholder" or "leaseholder replica" generally refers to a replica of a range that is configured to hold the lease for the replicas of the range. The leaseholder may receive and/or coordinate read transactions and write transactions directed to one or more KV pairs stored by the range. "Leaseholder node" may generally refer to the node of the cluster that stores the leaseholder replica. The leaseholder may receive read transactions and serve reads to client devices indicated by the read transactions. Other replicas of the range that are not the leaseholder may receive read transactions and route the read transactions to the leaseholder, such that the leaseholder can serve the read based on the read transaction.

"Raft leader" or "leader" generally refers to a replica of the range that is a leader for managing write transactions for a range. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write transactions from the leader replica. The leader replica and the follower replicas of a range may constitute voting replicas that participate in a distributed consensus protocol and included operations (also referred to as "Raft protocol" and "Raft operations" as described herein.

"Raft log" generally refers to a time-ordered log of write transactions to a range, where the log of write transactions includes write transactions agreed to by a threshold number of the replicas of the range. Each replica of a range may include a raft log stored on the node that stores the replica. The leader replica and the follower replicas of a range may constitute voting replicas that participate in a distributed consensus protocol and included operations (also referred to as "Raft protocol" and "Raft operations" as described herein). A raft log for a replica may be stored on persistent storage (e.g., non-volatile storage such as disk storage, solid state drive (SSD) storage, etc.). A raft log may be a source of truth for replication among nodes for a range.

"Consistency" generally refers to causality and the ordering of transactions within a distributed system. Consistency defines rules for operations within the distributed system, such that data stored by the system will remain consistent with respect to read and write operations originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the range(s) targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

Database Overview

A database stored by a cluster of nodes may operate based on one or more remote procedure calls (RPCs). The database may be comprised of a KV store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations that may operate on the distributed KV store.

In some embodiments, as described herein, the KV store of the database may be comprised of one or more ranges. A range may be a selected storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on and be available on other nodes such that the range can still be accessed by client devices and replicated to other nodes of the cluster.

In some embodiments, operations directed to KV data as described herein may be executed by one or more transactions. In some cases, a node may receive a read transaction from a client device. A node may receive a write transaction from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read or write transaction that it cannot directly serve, the node may send and/or otherwise route the transaction to the node that can serve the transaction.

In some embodiments, modifications to the data of a range may rely on a consensus protocol to ensure a threshold number of replicas of the range agree to commit the change. The threshold may be a majority of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time (e.g., at a specific timestamp). A timestamp associated with a key corresponding to KV data may be assigned by a gateway node that received the transaction that wrote and/or otherwise modified the key. For a transaction that wrote and/or modified the respective key, the gateway node (e.g., the node that initially receives a transaction) may determine and assign a timestamp to the transaction based on time of a clock of the node. The transaction may assign the timestamp to the KVs that are subject to the transaction. Timestamps may enable tracking of versions of KVs (e.g., through multi-version concurrency control (MVCC) as to be described herein) and may provide guaranteed transactional isolation. In some cases, additional or alternative methods may be used to assign versions and/or timestamps to keys and respective values.

In some embodiments, a "table descriptor" may correspond to each table of the database, where the table descriptor may contain the schema of the table and may include information associated with the table. Each table descriptor may be stored in a "descriptor table", where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

In some cases, the SQL layer of the database architecture exposes a SQL application programming interface (API) to developers and converts high-level SQL statements into low-level read and write requests to the underlying KV store, which are passed to the transaction layer. The transaction layer of the database architecture can implement support for atomic, consistent, isolated, and durable (ACID) transactions by coordinating concurrent operations. The distribution layer of the database architecture can provide a unified view of a cluster's data. The replication layer of the database architecture can copy data between nodes and ensure consistency between these copies by implementing a consensus algorithm. The storage layer may commit writes from the Raft log to disk (e.g., a computer-readable storage medium on a node), as well as return requested data (e.g., read data) to the replication layer.

Database Architecture

Referring to FIG. 1, an illustrative distributed computing system 100 is presented. The computing system 100 may include a cluster 102. In some cases, the computing system may include one or more additional clusters 102. The cluster 102 may include one or more nodes 120 distributed among one or more geographic regions 110. The geographic regions 110 may correspond to cluster regions and database regions as described further below. A node 120 may be a computing device. In some cases, a node 120 may include at least portions of the computing system as described herein with respect to FIG. 8. As an example, a node 120 may be a server computing device. A region 110 may correspond to a particular building (e.g., a data center), city, state/province, country, geographic region, and/or a subset of any one of the above. A region 110 may include multiple elements, such as a country and a geographic identifier for the country. For example, a region 110 may be indicated by Country=United States and Region=Central, which may indicate a region 110 as the Central United States. As shown in FIG. 1, the cluster 102 may include regions 110a, 110b, and 110c. In some cases, the cluster 102 may include one region 110. In an example, the region 110a may be the Eastern United States, the region 110b may be the Central United States, and the region 110c may be the Western United States. Each region 110 of the cluster 102 may include one or more nodes 120. In some cases, a region 110 may not include any nodes 120. The region 110a may include nodes 120a, 120b, and 120c. The region 110b may include the nodes 120d, 120e, and 120f. The region 110c may include nodes 120g, 120h, and 120i.

Each node 120 of the cluster 102 may be communicatively coupled via one or more networks 112 and 114. In some cases, the cluster 102 may include networks 112a, 112b, and 112c, as well as networks 114a, 114b, 114c, and 114d. The networks 112 may include a local area network (LAN), wide area network (WAN), and/or any other suitable network. In some cases, the one or more networks 112 may connect nodes 120 of different regions 110. The nodes 120 of region 110a may be connected to the nodes 120 of region 110b via a network 112a. The nodes 120 of region 110a may be connected to the nodes 120 of region 110c via a network 112b. The nodes 120 of region 110b may be connected to the nodes 120 of region 110c via a network 112c. The networks 114 may include a LAN, WAN, and/or any other suitable network. In some cases, the networks 114 may connect nodes 120 within a region 110. The nodes 120a, 120b, and 120c of the region 110a may be interconnected via a network 114a. The nodes 120d, 120e, and 120f of the region 110b may be interconnected via a network 114b. In some cases, the nodes 120 within a region 110 may be connected via one or more different networks 114. The node 120g of the region 110c may be connected to nodes 120h and 120i via a network 114c, while nodes 120h and 120i may be connected via a network 114d. In some cases, the nodes 120 of a region 110 may be located in different geographic locations within the region 110. For example, if region 110a is the Eastern United States, nodes 120a and 120b may be located in New York, while node 120c may be located in Massachusetts.

In some embodiments, the computing system 100 may include one or more client devices 106. The one or more client devices 106 may include one or more computing devices. In some cases, the one or more client devices 106 may each include at least portions of the computing system as described herein with respect to FIG. 8. In an example, the one or more client devices 106 may include laptop computing devices, desktop computing devices, mobile computing devices, tablet computing devices, and/or server computing device. As shown in FIG. 1, the computing system 100 may include client devices 106a, 106b, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN, a WAN, and/or any other suitable network as described herein. As an example, the client devices 106 may communicate with the nodes 120 via a SQL client operating at each respective client device 106. To access and/or otherwise interact with the data stored by the cluster 102, a client device 106 may communicate with a gateway node, which may be a node 120 of the cluster that is closest (e.g., by latency, geographic proximity, and/or any other suitable indication of closeness) to the client device 106. The gateway node may route communications between a client device 106 and any other node 120 of the cluster.

Transaction Execution

In some embodiments, as described herein, distributed transactional databases stored by the cluster of nodes may enable one or more transactions. Each transaction may include one or more requests (e.g., queries) directed to performing one or more operations. In some cases, a request may be a query (e.g., a SQL query). A request may traverse one or more nodes of a cluster to execute the request. A request may interact with (e.g., sequentially interact with) one or more of the following: a SQL client, a load balancer, a gateway, a leaseholder, and/or a Raft Leader as described herein. A SQL client may send a request (e.g., query) to a cluster. The request may be included in a transaction, where the transaction is a read and/or a write transaction as described herein. A load balancer may route the request from the SQL client to the nodes of the cluster. A gateway node may be a node that initially receives the request and/or sends a response to the SQL client. A leaseholder may be a node that serves reads and coordinates writes for a range of keys (e.g., keys indicated in the request) as described herein. A Raft leader may be a node that maintains consensus among the replicas for a range.

A SQL client (e.g., operating at a client device 106a) may send a request (e.g., a SQL request) to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120a) may receive the request from the load balancer. The gateway node may parse the request to determine whether the request is valid. The request may be valid based on conforming to the syntax (e.g., SQL syntax) of the database(s) stored by the cluster. An optimizer operating at the gateway node may generate a number of logically equivalent query plans based on the received request. Each query plan may correspond to a physical operation tree configured to be executed for the query. The optimizer may select an optimal query plan from the number of query plans (e.g., based on a cost model). Based on the completion of request planning, a query execution engine may execute the selected, optimal query plan using a transaction coordinator as described herein. A transaction coordinator operating on a gateway node may perform one or more operations as a part of the transaction layer. The transaction coordinator may perform KV operations on a database stored by the cluster. The transaction coordinator may account for keys indicated and/or otherwise involved in a transaction. The transaction coordinator may package KV operations into a Batch Request as described herein, where the Batch Request may be forwarded on to a Distribution Sender (DistSender)

operating on the gateway node. A DistSender of a gateway node and/or coordinating node may receive Batch Requests from a transaction coordinator of the same node. The DistSender of the gateway node may receive the Batch Request from the transaction coordinator. The DistSender may determine the operations indicated by the Batch Request and may determine the node(s) (i.e. the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator, the DistSender may send the next Batch Request for the range corresponding to the provisional acknowledgement. The DistSender may wait to receive acknowledgments for write operations and values for read operations corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write operation in the Batch Request may compare a timestamp of the write operation to the timestamp cache. A timestamp cache may track the highest timestamp (i.e., most recent timestamp) for any read operation that a given range has served. The comparison may ensure that the write operation has a higher timestamp than any timestamp indicated by the timestamp cache. If a write operation has a lower timestamp than any timestamp indicated by the timestamp cache, the write operation may be restarted at an advanced timestamp that is greater than the value of the most recent timestamp indicated by the timestamp cache.

In some embodiments, operations indicated in the Batch Request may be serialized by a latch manager of a leaseholder. For serialization, each write operation may be given a latch on a row. Any read and/or write operations that arrive after the latch has been granted on the row may be required to wait for the write operation to complete. Based on completion of the write operation, the latch may be released and the subsequent operations can proceed to execute. In some cases, a batch evaluator may ensure that write operations are valid. The batch evaluator may determine whether the write operation is valid based on the leaseholder's data. The leaseholder's data may be evaluated by the batch evaluator based on the leaseholder coordinating writes to the range. If the batch evaluator determines the write operation to be valid, the leaseholder may send a provisional acknowledgement to the DistSender of the gateway node, such that the DistSender may begin to send subsequent Batch Requests for the range to the leaseholder.

In some embodiments, operations may read from the local instance of the storage engine as described herein to determine whether write intents are present at a key. If write intents are present at a particular key, an operation may resolve write intents as described herein. If the operation is a read operation and write intents are not present at the key, the read operation may read the value at the key of the leaseholder's storage engine. Read responses corresponding to a transaction may be aggregated into a Batch Response by the leaseholder. The Batch Response may be sent to the DistSender of the gateway node. If the operation is a write operation and write intents are not present at the key, the KV operations included in the Batch Request that correspond to the write operation may be converted to Raft (i.e. distributed consensus) operations and write intents, such that the write operation may be replicated to the replicas of the range.

With respect to a single round of distributed consensus, the leaseholder may propose the Raft operations to the leader replica of the Raft group (e.g., where the leader replica is typically also the leaseholder). Based on receiving the Raft operations, the leader replica may send the Raft operations to the follower replicas of the Raft group. Writing and/or execution of Raft operations as described herein may include writing one or more write intents to persistent storage. The leader replica and the follower replicas may attempt to write the Raft operations to their respective Raft logs. When a particular replica writes the Raft operations to its respective local Raft log, the replica may acknowledge success of the Raft operations by sending an indication of a success of writing the Raft operations to the leader replica. If a threshold number of the replicas acknowledge writing the Raft operations (e.g., the write operations) to their respective Raft log, consensus may be achieved such that the Raft operations may be committed (referred to as "consensus-committed" or "consensus-commit"). The consensus-commit may be achieved for a particular Raft operation when a majority of the replicas (e.g., including or not including the leader replica) have written the Raft operation to their local Raft log. The consensus-commit may be discovered or otherwise known to the leader replica to be committed when a majority of the replicas have sent an indication of success for the Raft operation to the leader replica. Based on a Raft operation (e.g., write operation) being consensus-committed among a Raft group, each replica included in the Raft group may apply the committed entry to their respective local state machine. Based on achieving consensus-commit among the Raft group, the Raft operations (e.g., write operations included in the write transaction) may be considered to be committed (e.g., implicitly committed as described herein). The gateway node may update the status of transaction record for the transaction corresponding to the Raft operations to committed (e.g., explicitly committed as described herein). A latency for the above-described distributed consensus round may be equivalent to a duration for sending a Raft operation from the leader replica to the follower replicas, receiving success responses for the Raft operation at the leader replica from at least some of the follower replicas (e.g., such that a majority of replicas write to their respective Raft log), and writing a write intent to persistent storage at the leader and follower replicas in parallel.

In some embodiments, based on the leader replica writing the Raft operations to the Raft log and receiving an indication of the consensus-commit among the Raft group, the leader replica may send a commit acknowledgement to the DistSender of the gateway node. The DistSender of the gateway node may aggregate commit acknowledgements from each write operation included in the Batch Request. In some cases, the DistSender of the gateway node may aggregate read values for each read operation included in the Batch Request. Based on completion of the operations of the Batch Request, the DistSender may record the success of each transaction in a corresponding transaction record. To record the success of a transaction, the DistSender may check the timestamp cache of the range where the first operation of the write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the transaction coordinator. The transaction coordinator may send the values to the SQL layer. In some cases, the transaction coordinator may also send a request to the DistSender, where the request includes an indication for the DistSender to convert write intents to committed values (e.g., MVCC values). The SQL layer may send the values as described herein to the SQL client that initiated the query (e.g., operating on a client device).

Read Transaction Execution

Figure 2A:
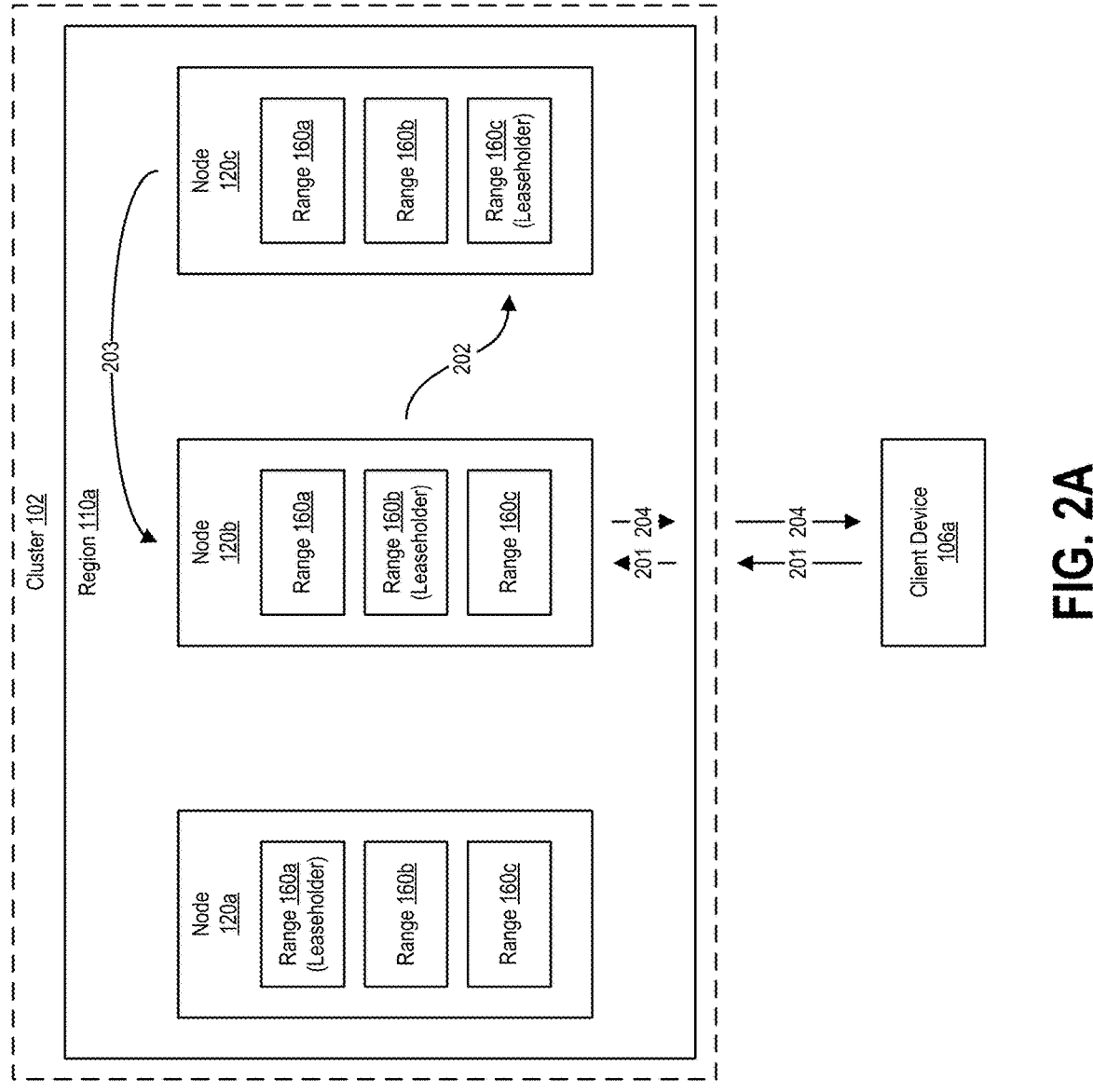
FIG. 2A shows an example of execution of a read transaction at the computing system, according to some embodiments.

Referring to FIG. 2A, an example of execution of a read transaction at the computing system 100 is presented. In some cases, the nodes 120a, 120b, and 120c, of region 110a may include one or more replicas of ranges 160. The node 120a may include replicas of ranges 160a, 160b, and 160c, where ranges 160a, 160b, and 160c are different ranges. The node 120a may include the leaseholder replica for range 160a (as indicated by "Leaseholder" in FIG. 2A). The node 120b may include replicas of ranges 160a, 160b, and 160c. The node 120b may include the leaseholder replica for range 160b (as indicated by "Leaseholder" in FIG. 2A). The node 120c may include replicas of ranges 160a, 160b, and 160c. The node 120c may include the leaseholder replica for range 160c (as indicated by "Leaseholder" in FIG. 2A). While FIG. 2A is described with respect to communication between nodes 120 of a single region (e.g., region 110a), a read transaction may operate similarly between nodes 120 located within different geographic regions.

In some embodiments, a client device 106 may initiate a read transaction at a node 120 of the cluster 102. Based on the KVs indicated by the read transaction, the node 120 that initially receives the read transaction (e.g., the gateway node) from the client device 106 may route the read transaction to a leaseholder of the range 160 comprising the KVs indicated by the read transaction. The leaseholder of the range 160 may serve the read transaction and send the read data to the gateway node. The gateway node may send the read data to the client device 106.

As shown in FIG. 2A, at step 201, the client device 106 may send a read transaction to the cluster 102. The read transaction may be received by node 120b as the gateway node. The node 120b may be a node 120 located closest to the client device 106, where the closeness between the nodes 120 and a client device 106 may correspond to a latency and/or a proximity as described herein. The read transaction may be directed to data stored by the range 160c. At step 202, the node 120b may route the received read transaction to node 120c. The read transaction may be routed to node 120c based on the node 120c being the leaseholder of the range 160c. The node 120c may receive the read transaction from node 120*b* and serve the read transaction from the range 160*c*. At step 203, the node 120*c* may send the read data to the node 120*b*. The node 120*c* may send the read data to node 120*b* based on the node 120*b* being the gateway node for the read transaction. The node 120*b* may receive the read data from node 120*c*. At step 204, the node 120*b* may send the read data to the client device 106*a* to complete the read transaction. If node 120*b* had been configured to include the leaseholder for the range 160*c*, the node 120*b* may have served the read data to the client device directly after step 201, without routing the read transaction to the node 120*c*.

Write Transaction Execution

Figure 2B:
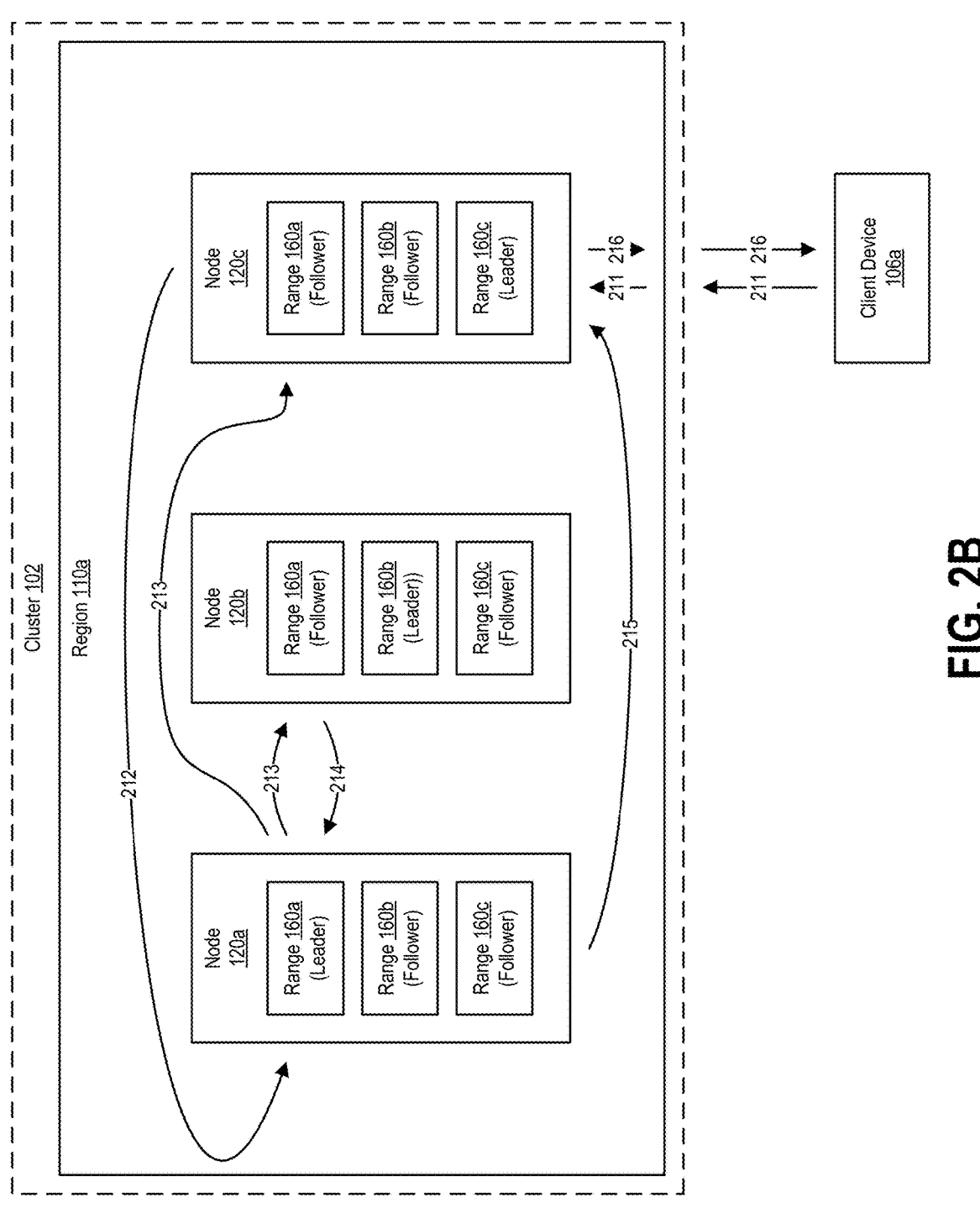
FIG. 2B shows an example of execution of a write transaction at the computing system, according to some embodiments.

Referring to FIG. 2B, an example of execution of a write transaction at the computing system 100 is presented. In some cases, as described herein, the nodes 120*a*, 120*b*, and 120*c*, of region 110*a* may include one or more replicas of ranges 160. The node 120*a* may include replicas of ranges 160*a*, 160*b*, and 160*c*, where ranges 160*a*, 160*b*, and 160*c* are different ranges. The node 120*a* may include the lease-holder replica and the leader replica for range 160*a* (as indicated by "Leaseholder" in FIG. 2A and "Leader" in FIG. 2B). The node 120*b* may include replicas of ranges 160*a*, 160*b*, and 160*c*. The node 120*b* may include the leader replica for range 160*b* (as indicated by "Leader" in FIG. 2B). The node 120*c* may include replicas of ranges 160*a*, 160*b*, and 160*c*. The node 120*c* may include the leader replica for range 160*c* (as indicated by "Leader" in FIG. 2B). While FIG. 2B is described with respect to communication between nodes 120 of a single region (e.g., region 110*a*), a write transaction may operate similarly between nodes 120 located within different geographic regions.

In some embodiments, a client device 106 may initiate a write transaction at a node 120 of the cluster 102. Based on the KVs indicated by the write transaction, the node 120 that initially receives the write transaction (e.g., the gateway node) from the client device 106 may route the write transaction to a leaseholder of the range 160 comprising the KVs indicated by the write transaction. The leaseholder of the range 160 may route the write request to the leader replica of the range 160. In most cases, the leaseholder of the range 160 and the leader replica of the range 160 are the same. The leader replica may append the write transaction to a Raft log of the leader replica and may send the write transaction to the corresponding follower replicas of the range 160 for replication. Follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The gateway node may send the acknowledgement to the client device 106.

As shown in FIG. 2B, at step 211, the client device 106 may send a write transaction to the cluster 102. The write transaction may be received by node 120*c* as the gateway node. The write transaction may be directed to data stored by the range 160*a*. At step 212, the node 120*c* may route the received write transaction to node 120*a*. The write transaction may be routed to node 120*a* based on the node 120*a* being the leaseholder of the range 160*a*. Based on the node 120*a* including the leader replica for the range 160*a*, the leader replica of range 160*a* may append the write transaction to a Raft log at node 120*a*. At step 213, the leader replica may simultaneously send the write transaction to the follower replicas of range 160*a* on the node 120*b* and the node 120*c*. The node 120*b* and the node 120*c* may append the write transaction to their respective Raft logs. At step 214, the follower replicas of the range 160*a* (at nodes 120*b* and 120*c*) may send an indication to the leader replica of the range 160*a* that the write transaction was appended to their Raft logs. Based on a threshold number of replicas indicating the write transaction was appended to their Raft logs, the leader replica and follower replicas of the range 160*a* may commit the write transaction. At step 215, the node 120*a* may send an acknowledgement of the committed write transaction to the node 120*c*. At step 216, the node 120*c* may send the acknowledgement of the committed write transaction to the client device 106*a* to complete the write transaction.

Storage Layer

In some cases, a storage layer as described herein may be an embedded KV store. The storage layer may enable the cluster to read and write data to storage device(s) of each node. As described herein, data may be stored as KV pairs on the storage device(s) using a storage engine. The storage layer may provide atomic write batches and snapshots, which can indicate a subset of transactions. The storage layer may use an LSM tree to manage data storage. In some cases, the LSM tree is a hierarchical tree including a number of levels. For each level of the LSM tree, one or more files may be stored on persistent storage media (e.g., disk storage, solid state drive (SSD) storage, etc.) that include the data referenced at that respective level. The files may be sorted string table files (referred to as "SST" or "SST file"). In some cases, SSTs are an on-disk (e.g., on persistent, non-volatile storage such as disk storage, SSD storage, etc.) representation of sorted lists of KV pairs. SST files can be immutable, such that they are never modified (e.g., even during a compaction process).

Figure 3:
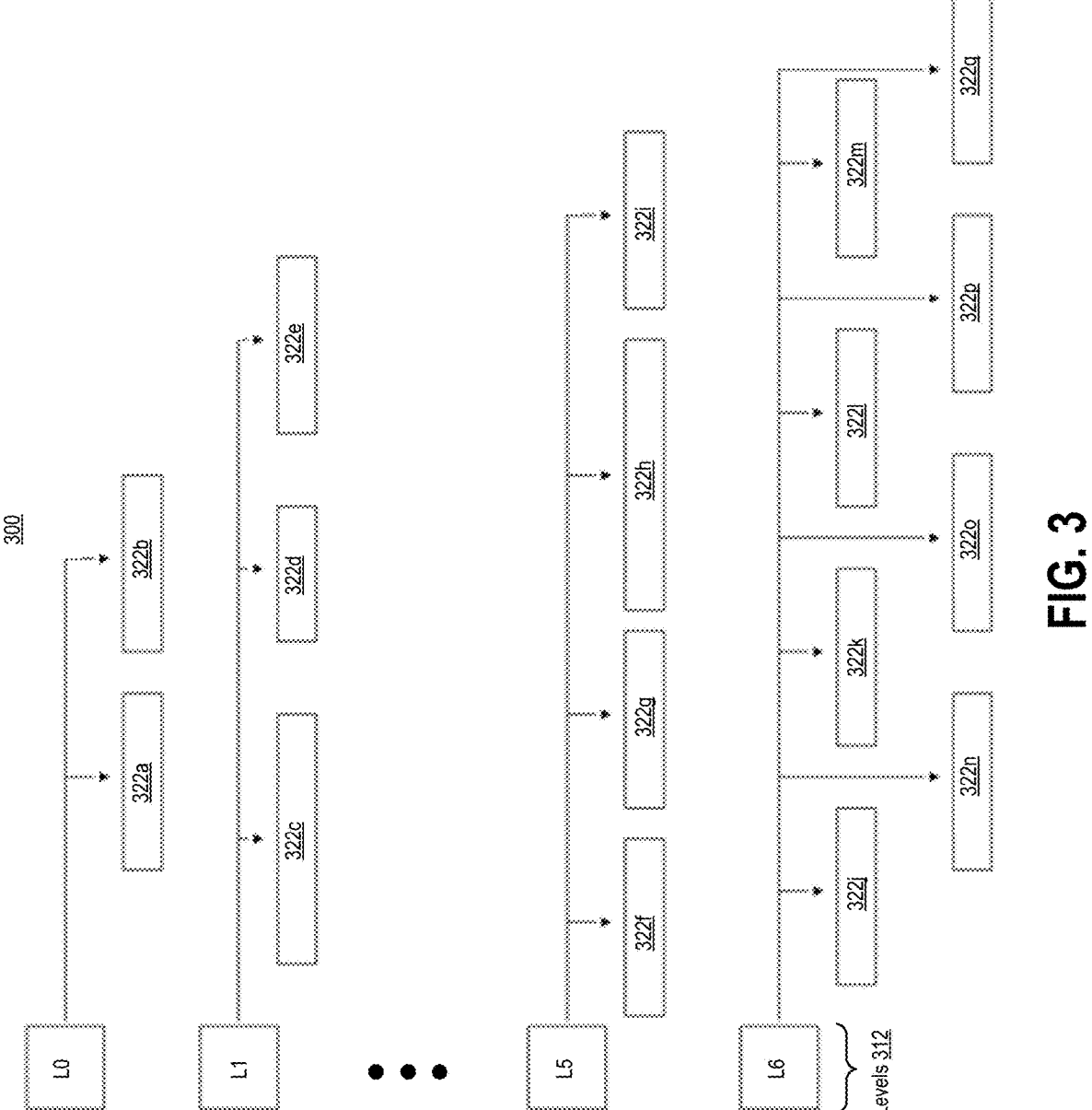
FIG. 3 shows an exemplary illustration of a log-structured merge (LSM) tree of a computing system, according to some embodiments.

In some cases, levels of the LSM tree can be organized in descending order from level 0 (L0) to level 6 (L6), where L0 is the top-most level and L6 is the bottom-most level. New data can be added into L0 (e.g., using insert or import operations) and then transferred downward into lower levels of the LSM tree over time. FIG. 3 shows an exemplary illustration 300 of an LSM tree. The LSM tree shown in the illustration 300 include a number of levels 312, including L0, L1, level 2 (L2) (not shown), level 3 (L3) (not shown), level 4 (L4) (not shown), level 5 (L5), and L6. Each level of an LSM tree can be associated with a set of SSTs 322 spanning a key space of permissible key values, where each SST 322: (i) includes a segment of the key space, (ii) is immutable, and (iii) has a unique identifier (e.g., a mono-tonically increasing number). As shown in FIG. 3, the L0 may include SSTs 322*a* and 322*b*. L1 may include SSTs 322*c*, 322*e*, and 322*e*. L5 may include SSTs 322*f*, 322*g*, 322*h*, and 322*i*. L6 may include SSTs 322*j*, 322*k*, 3221, 322*m*, 322*n*, 322*o*, 322*p*, and 322*q*. While the levels 312 of the LSM tree shown and described with respect to FIG. 3 are described as including an exemplary number of SSTs, each of the levels 312 may include any suitable number of SSTs 322. In some cases, the SSTs 322 within some of the levels 312 may be non-overlapping, such that a segment of a key space corresponding to a first SST 322 in a particular level (e.g., L1) does not overlap with a segment of the key space corresponding to a second SST 322 in the same level. For example, if a first SST of L1 includes a segment of the key space for the keys [A-F) (non-inclusive), a second SST of L1 will contain a segment of the key space for keys [F-R), and so on. The L0 level may be an exception to such non-overlapping and may be the only level of the LSM tree that can contain SSTs including respective segments of the key space that may overlap and have overlapping keys. Such an exception can be necessary to allow LSM tree-based storage engines to support ingesting large amounts of data, such as when using an import statement. Such an exception can be necessary to allow for easier and more efficient flushes of memtables as described herein.

In some cases, a process of merging (e.g., combining) SSTs and transferring the SSTs from L0 to lower levels (e.g., L1-L6) in the LSM tree may be referred to as "compaction". Compaction may include deleting SSTs in a first, higher level of the LSM tree and writing a new SST including at least some (e.g., all) the data of the deleted SSTs in a second, lower level of the LSM that is below (e.g., immediately below) the first level. The storage engine may operate to compact data as quickly as possible. As a result of compaction, lower levels of the LSM tree can (e.g., should) include larger numbers of SST files and/or larger-sized SST files that contain less recently updated keys, while higher levels of the LSM tree can (e.g., should) include smaller numbers of SST files and/or smaller-sized SST files that contain more recently updated keys. A size of an SST file may correspond to a storage (e.g., byte) size of the SST file. Generally, during normal operation of an LSM tree, lower levels of the LSM tree store more data (e.g., a greater number of bytes) than higher levels of the LSM tree.

In some cases, the compaction process is necessary to enable efficient operation of an LSM tree. From L0 down to L6 and during normal (e.g., healthy) operation of the LSM tree, each level of the LSM tree should have about $\frac{1}{10}$ (10%) as much data (e.g., by storage size for the data) as the next level below. For example, L1 should store about $\frac{1}{10}$ of the amount of data stored by L2, L2 should store about $\frac{1}{10}$ of the amount of data stored by L3, and so on. For optimized operation of the LSM tree, as much data as possible is stored in larger SSTs included in lower levels of the LSM tree. When compaction operations fall behind and SSTs are not able to be compacted to lower levels of the LSM tree at a sufficient rate, an inverted LSM tree can form based on accumulation of SSTs at higher levels of the LSM tree as described herein.

In some cases, SST files are not modified during the compaction process. In some cases, new SSTs are instead written, and old SSTs are deleted. This design takes advantage of the fact that sequential disk access is faster than random disk access.

In some cases, the process of compaction can operate as follows: if two SST files referred to as SST file "A" and SST file "B" need to be merged, their contents (e.g., KV pairs) are read into memory (e.g., volatile storage of a node). Based on reading the contents of the SST files A and B, the contents are sorted (e.g., sorted by key) in a list and merged together in memory, and a new SST file "C" is opened and written to disk (e.g., non-volatile, persistent storage of a node) with the new, larger sorted list of KV pairs. Based on the SST file C being written to disk, the old SST files A and B may be deleted.

In some cases, if the compaction process for the LSM tree falls behind the amount of data being added to the LSM tree (e.g., via admission of work items), more data may be stored at a higher level of the LSM tree than a lower level of the LSM tree and a shape of the LSM tree can become inverted. An inverted LSM tree (not shown in FIG. 3) can have degraded read performance and high read amplification. For an inverted LSM tree, read operations are required to start in higher levels of the LSM tree and search (referred to as "look down") through a number of SSTs in different levels of the LSM tree to read a particular key's correct (e.g., newest or freshest) value. A state where the storage engine needs to read from multiple memtables and/or SST files in order to service a single logical read operation may be referred to as "read amplification". Read amplification can be especially harmful when a large import operation overloads the cluster (e.g., based on insufficient CPU capacity) and the storage engine is required to search a number of smaller-sized SSTs in L0 to identify the most up-to-date values of the keys being read (e.g., using a select operation). In some cases, a certain amount of read amplification is expected in a normally functioning cluster. For example, an LSM tree can be considered to be healthy (e.g., have sufficient performance) when a read amplification factor for the LSM tree is less than 10. A read amplification factor may refer to a number of memtables and levels of SSTs in the LSM tree that are required to be read to service a particular read operation. A value for a read amplification factor may be equivalent to a number of memtables included in an LSM tree, a number of vertically disposed, horizontal lower levels (e.g., L1-L6) of the LSM tree, and a number of vertically disposed, horizontal sub-levels included in a top level (e.g., L0) of the LSM tree.

In some cases, write amplification can impact an LSM tree. In some cases, write amplification can refer to rewriting (e.g., deleting and writing) of SST files by a storage engine as a part of compaction operations for an LSM tree. For example, when a storage engine executes a number of compaction operations in L5 of an LSM tree, the storage engine may repeatedly rewrite SST files included in L5. Such repeated rewriting of SST files can be a performance tradeoff, since when the storage engine does not perform compaction operations at a sufficient rate, a size of L0 of the LSM tree can increase to be too large and an inverted LSM tree can form.

In some cases, read amplification and write amplification may be key performance indicators for an LSM tree. For optimal database performance, both read amplification and write amplification must not occur in excess and must be kept in balance. Maintaining such a balance can involve tradeoffs. In some cases, inverted LSM trees can have excessive compaction debt, which refers to the storage engine having a large backlog of compaction operations to perform to return the inverted LSM tree to a healthy, non-inverted state.

In some cases, to facilitate managing the LSM tree structure, the storage engine can maintain an in-memory representation of the LSM tree referred to as a "memory table" or "memtable". In some cases, an LSM tree may not include a memtable (e.g., after a memtable is flushed to L0-L6 of the LSM tree). In some cases, an LSM tree may include one or more memtables. Write operations to the LSM tree may be considered durable when the work items for write operations have been (i) added to a memtable (e.g., thereby making the written value(s) visible to subsequent read operations), and (ii) written to a write-ahead log (WAL) file. A memtable may have a fixed amount of memory (e.g., 128 MB), such that when a memtable is full, the memtable stops accepting new write operations and a new memtable is generated to receive the new write operations. In some cases, the storage engine may enforce a maximum allowed number of memtables for an LSM tree. As an example, an LSM tree may not include more than 2-10 memtables and may preferably not include more than 4 memtables. In some cases, data from a memtable is periodically flushed (e.g., transferred) to SST files of the LSM tree stored on persistent storage media. Data from a memtable may be flushed to levels (e.g., L0-L6) of the LSM tree when the memtable reaches a maximum memory capacity. In some cases, a WAL file stored on the persistent storage media can be associated with each memtable to ensure durability in case of node failures (e.g., power loss or other unavailability). The WAL file can store the newest (e.g., freshest or most recent) operations issued to the storage engine by the replication layer. Each WAL file may have a one-to-one correspondence with a memtable. Each WAL file and memtable can be kept in sync and updates from the WAL file and memtable can be written to SSTs periodically as part of operations of the storage engine.

Figure 4:
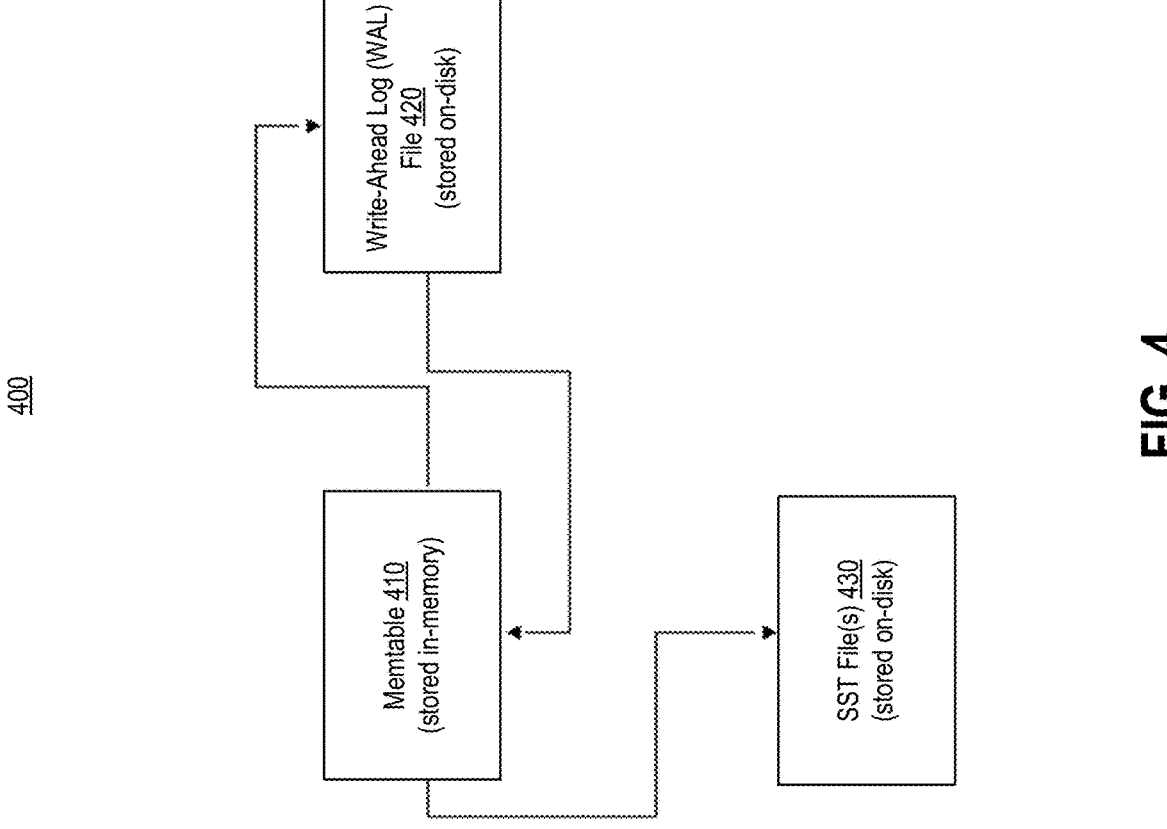
FIG. 4 shows an exemplary block diagram illustrating a storage layer of a computing system, according to some embodiments.

FIG. 4 shows an exemplary block diagram 400 illustrating a relationship between the memtable 410, the WAL file 420, and one or more SST files 430 included in the storage layer of the database. A memtable 410 may be stored in volatile storage media of a node. A WAL file 420 may be stored on persistent, non-volatile storage media of a node. One or more SST files 430 may be stored on persistent, non-volatile storage media of a node. As shown in FIG. 4, new values may be simultaneously written to the WAL file 420 and the memtable 410. From the memtable 410, the stored values may be eventually written to the one or more SST files 430 on disk for longer-term storage. As described herein, one or more memtables 410 may be included in an LSM tree that each correspond to a respective WAL file 420.

In some cases, a design of the LSM tree can optimize write operation performance over read operation performance. By storing sorted KV data in SSTs, the storage engine avoids random disk searches when performing write operations. The storage engine of the storage layer can attempt to mitigate the cost of read operations (random searches) by executing read operations at SSTs located in the lowest possible levels of the LSM tree, such that the storage engine reads from fewer, larger SST files. The storage engine performs compaction operations to compact and merge SSTs to produce the fewer, larger files located in lower levels of the LSM tree. In some cases, the storage engine can use a block cache to increase the speed of read operations. The tradeoffs in the design of the LSM tree are intended to take advantage of the operating parameters of modern disk storage, since modern disk storage can provide faster read operations of random locations on disk due to caches, but can perform relatively poorly on write operations directed to random locations.

Admission Control I/O

Figure 5:
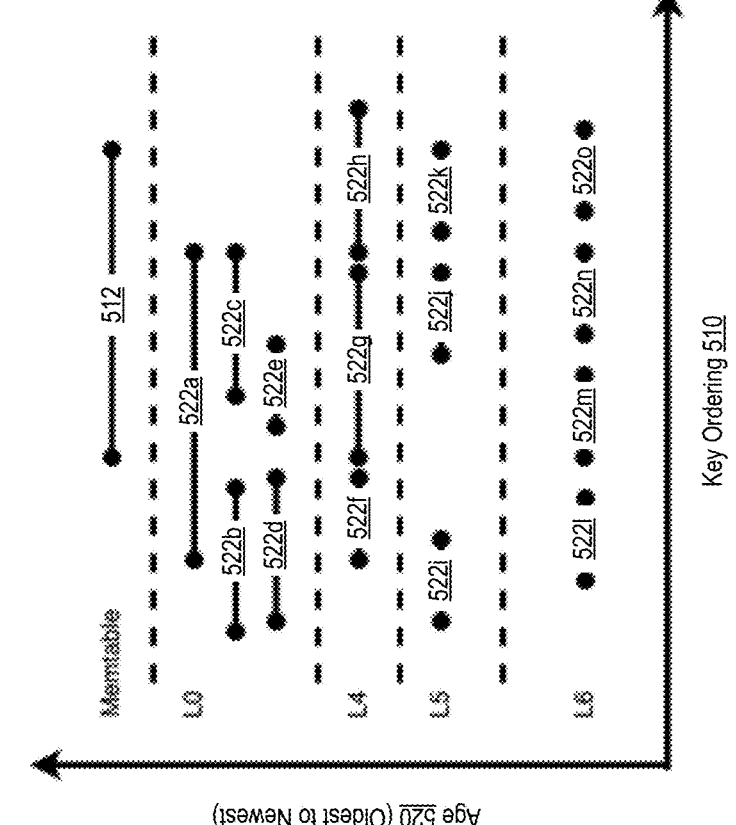
FIG. 5 shows an exemplary illustration of relationship between an LSM tree and a memory table (memtable), according to some embodiments.

As described herein, an LSM tree-based storage layer of a distributed database system can be organized into a plurality of levels (e.g., L0-L6). FIG. 5 shows an exemplary illustration 500 of relationship between an LSM tree and a memtable 512, where the memtable 512 and SSTs 522 (e.g., included SSTs 522a-522p) are organized based on a key ordering 510 and an age 520 of values included in the SSTs. Key ordering 510 may refer to ordering of keys included in a key space, where keys may be ordered using any suitable ordering technique (e.g., alphanumeric ordering). The age 520 of values included in SSTs may refer to when values corresponding to keys were most recently updated, where the oldest keys are those with the least recently updated values and the newest keys are those with the most recently updated values. Boundaries of the memtable 512 and SSTs 522 as shown in FIG. 5 may correspond to respective segments of the key space that are spanned by keys included in the memtable and SSTs. As described herein, levels L1 and lower (e.g., to L6) of the LSM tree may not include SSTs with keys corresponding to overlapping segments of the key space, while L0 can include SSTs with keys corresponding to overlapping segments of the key space. Read amplification as described herein may refer to a maximum number of files (e.g., memtables and SSTs) in a vertical section of the LSM tree, which can be based on a number of memtables included in the LSM tree, a number of sublevels included in level L0 of the LSM tree, and a number of other levels (e.g., L1-L6) included in the LSM tree. A storage engine of the storage layer may control any and/or all operations corresponding to the LSM tree and a related admission queue for the LSM tree. For example, the storage engine may generate a number of tokens and may admit work items corresponding to write operations from an admission queue based on the work items consuming generated tokens as described herein.

In some cases, the number of files and sublevels included in L0 may be dynamically changing based on a rate of write operations to the LSM tree, such that there is no limit (e.g., upper bound) to the number of files and sublevels included in L0. Accordingly, read amplification can increase without bound, which reduces speeds for read operations. Further, the number of memtables included in an LSM tree may be dynamically changing based on flush rates for flushing memtables to levels of the LSM tree.

In some embodiments, data included in memtables can be flushed to SSTs included in L0 of the LSM tree. In some cases, there may be a maximum number of allowed memtables (e.g., 2, 3, 4, 6, 8, or 10 memtables) for an LSM tree. If a maximum (e.g., threshold) number of memtables is met (e.g., reached), write operations to the LSM tree can stall. Stalling of write operations to the LSM tree can occur when the rate of writing data to memtables based on write operations exceeds the rate of flushing of memtables to L0 of the LSM tree. In some cases, admission to the LSM tree as described herein may refer to admission of work items corresponding to write operations (e.g., included in transactions) to a memtable of one or more memtables, where a work item admitted and written to the memtable may be flushed to the LSM tree after admission from the admission queue.

In some embodiments, based on using admission control techniques to admit work items to the LSM tree, an admission queue may control work items corresponding to write operations admitted to the LSM tree. All write operations directed to KV data included in the LSM tree may be required to enter the LSM tree through the admission queue. In some cases, work items (e.g., write operations) at a front (also referred to as "head") of the admission queue are admitted to the LSM tree when a positive number of "byte tokens" are available for consumption by the work items. A number of byte tokens consumed by a particular work item can be based on (e.g., equivalent to, proportional to, etc.) a size (e.g., number of bytes) of the work item admitted to the LSM tree and/or a size (e.g., number of bytes) occupied by the admitted work item. For example, an amount of data (e.g., number of bytes) corresponding to a number of byte tokens consumed by a work item may be equivalent to a size of a work item. In some cases, a size of a particular work item may be equivalent to an amount of data added to an LSM tree when the work item is admitted to the LSM tree. Consumption of byte tokens by a work item may cause deletion or removal of the consumed byte tokens from the byte tokens available for consumption by other work items. Byte tokens can be computed and generated (e.g., replenished) as described herein. Byte tokens may be used to control and constrain a number of work items admitted from the admission queue to the LSM tree, where a number of available byte tokens may be consumed by work items for admission to the LSM tree, thereby causing other work items to wait for additional byte tokens to be made available. While systems and methods are described herein with respect to use of byte tokens, tokens configured to admit data of any suitable size may be used in place of byte tokens as described herein.

In some embodiments, to order (e.g., queue) work items within the admission queue, the admission queue may order individual work items based on a respective tuple corresponding to each work item. Each tuple may include: (i) a tenant identifier indicative of a tenant associated with (e.g., responsible for) the work item corresponding to the respective tuple, (ii) a priority indicator indicating a priority level (e.g., high, medium, or low priority) for the work item for the tenant, and (iii) a timestamp (e.g., transaction start time) for a transaction corresponding to the work item. The priority indicator of a tuple for a work item may correspond to the work item's priority for the particular tenant associated with the work item. A priority level indicated by the priority indicator may be a quantitative or categorical representation of priority. In some cases, priority indicators may only be compared on an intra-tenant basis, such that priority indicators of work items corresponding to different tenants cannot be compared and used for queueing inter-tenant work items. Priority indicators of work items associated with a tenant can enable starvation for lower priority work items, such that when higher priority work items corresponding to a particular tenant are consuming available resources, the lower priority work items corresponding to the same tenant will wait for an indefinite amount of time (e.g., forever) to be admitted to the LSM tree. The timestamp of a tuple may be the start time of the broader operation (e.g., database transaction) that includes the work item corresponding to the tuple. Accordingly, the admission queue may give queuing priority to work items corresponding to earlier timestamps (and earlier related transactions) (e.g., on a per-tenant basis). For example, work items in the admission queue may be queued based on a first-in, first-out (FIFO) queuing technique on a per-tenant basis based on timestamps (e.g., transaction start times) of the tuples corresponding to work items. Work items in the admission queue corresponding to a particular tenant and having the same timestamp may be ordered in the admission queue based on the priority level of the work items. For example, for work items having equivalent timestamps, a first subset of the work items having higher priority levels may be ordered for admission to the LSM tree before a second subset of the work items having lower priority levels. Work items may be queued serially and/or in parallel in the admission queue on a per-tenant basis, where each individual tenant may be queued serially and/or in parallel among the tenants for the particular node based on allocated byte tokens as described herein.

Figure 6:
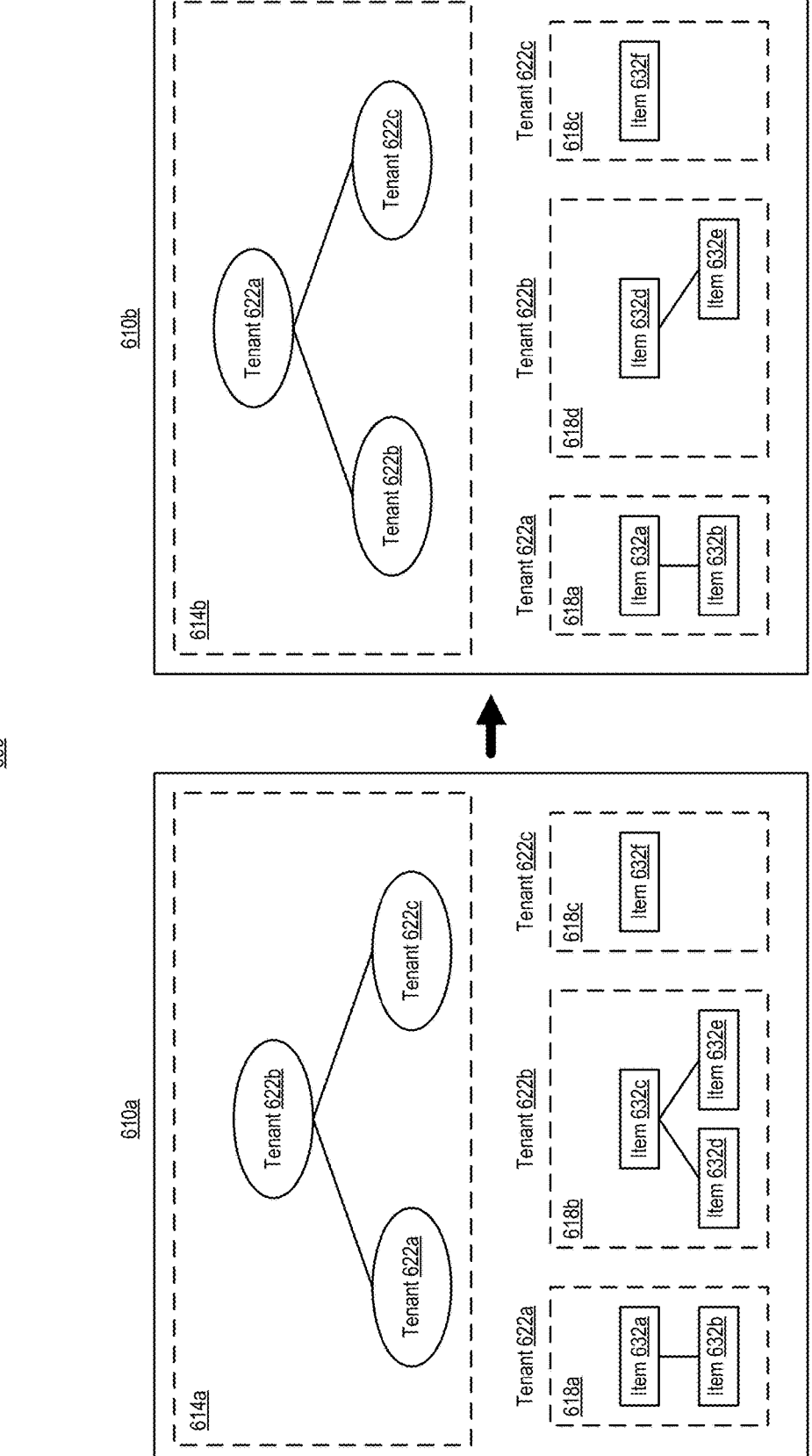
FIG. 6 shows an exemplary illustration of an admission queue for a storage layer of a computing system, according to some embodiments.

FIG. 6 is an exemplary illustration 600 of admission queues 610a and 610b for a storage layer. The illustration 600 includes a number of work items 632 corresponding to respective tenants 622, where tenants 622 are ordered in tenant heaps 614 and work items 632 corresponding to the tenants 622 are ordered in per-tenant heaps 618. The illustration 600 includes an admission queue 610a indicating a state of an admission queue 610 before admitting a work item 632c to an LSM tree and an admission queue 610b indicating a state of an admission queue 610 after admitting the work item 632c to the LSM tree. Admission of the work item 632c may be based on (i) a tuple of the work item 632c compared to tuples of other work items 632, (ii) a priority of tenants 622 within the tenant heap 614, and (iii) priorities of work items 632 within each per-tenant heap 618.

As shown in FIG. 6, the admission queues 610a and 610b each include work items 632 corresponding to tenants 622a, 622b, and 622c. Tenants 622 having work items 632 queueing for admission to the LSM tree can be queued in an admission queue 610 as described herein. Work items 632 corresponding to tenants 622 can be ordered for admission in a grouping referred to as a tenant heap 614 based on an increasing value of allocated byte tokens for a certain duration, where tenants 622 are ordered based on their respective priority in the tenant heap 614. For example, as shown in the tenant heap 614a for the admission queue 610a, tenant 622b is ordered and queued for admission to the LSM tree before both the tenants 622a and 622c based on allocated byte tokens as described herein. Based on admission of a work item 632 to the LSM tree, the tenant heap 614 can be reordered. For example, as shown in tenant heap 614b, the tenant 622a has been reordered to be queued for admission to the LSM tree before both the tenants 622b and 622c.

For each tenant 622, work items 632 are ordered in a grouping referred to as a per-tenant heap 618 based on the respective priority identifiers and timestamps of the tuples of the work items 632. For example, for the per-tenant heap 618b of tenant 622b in the admission queue 610a, the work item 632c is ordered for admission to the LSM tree before (e.g., ahead of) the work items 632d and 632e based on having a higher priority and/or an earlier timestamp. Based on admission of a work item 632 from a particular tenant heap 614 to the LSM tree, the particular tenant heap 614 can be reordered. For example, as shown in the admission queue 610b, the per-tenant heap 618d corresponding to the tenant 622b has been reordered relative to the per-tenant heap 618b previously corresponding to the tenant 622b in the admission queue 610a, such that the work item 632d is ordered for admission to the LSM tree before the work item 632e and the work item 632c has exited from the per-tenant heap 618d.

Based on the per-tenant heaps 618 of each tenant (e.g., ordered based on the tuples corresponding to each work item 632 in the admission queue 610) and based on the ordering of the tenant heap 614, work items 632 may be admitted to the LSM tree. For example, based on the work item 632c being next for admission in the admission queue 610a, the work item 632c may be admitted to the LSM tree. Based on admission of the work item 632c to the LSM tree, the tenant heap 614a and the per-tenant heap 618b of the admission queue 610a may be reordered to form the admission queue 610b including the reordered tenant heap 614b and the reordered per-tenant heap 618d.

Based on admission of a work item 632, the tenant heap 614 may be adjusted, since the respective tenant 622 corresponding to the admitted work item 632 has been granted additional byte tokens, and the respective per-tenant heap 618 corresponding to the admitted work item 632 is adjusted to remove the admitted work item 632.

In some embodiments, heaps 614 and per-tenant heaps 618 are used for logarithmic running time (e.g., O(log N)) addition, removal, and/or adjustment and can be computationally cheap enough for the granularity of work items being admitted to the LSM tree. In some cases, the processing (e.g., CPU) overhead of the admission control techniques described herein can be less than 1% of the processing (e.g., CPU) capacity of a node of the cluster.

In some cases, work items queued in an admission queue (e.g., admission queue 610) can be canceled. For example, when a work deadline corresponding to a work item is exceeded by a present time, the work item can be canceled and removed from the admission queue, thereby causing reordering of heaps included in the admission queue.

In some embodiments, as described herein, tenants having work items queued for admission to the LSM tree may be ordered in a tenant heap of the admission queue based on a number of byte tokens allocated to each tenant over a duration of time. Accordingly, the tenant heap of the admission queue may order tenants to ensure that each of the tenants of the cluster of nodes is allowed to admit an approximately equal and/or otherwise similar amount of work items (e.g., based on data size of the work items or number of the work items) to the LSM tree. In some cases, byte tokens consumed by work items for admission to the LSM tree may be referred to as "allocated byte tokens", where the work items correspond to a particular tenant. In the tenant heap (e.g., tenant heap 614), tenants having lower numbers of allocated byte tokens may be ordered before tenants with higher numbers of allocated byte tokens, thereby prioritizing work items corresponding to tenants having lower numbers of allocated byte tokens. In some cases, in the tenant heap, tenants may ordered in order of the tenant having the lowest number of allocated byte tokens to the tenant having the highest number of allocated byte tokens over a duration of time, where the tenant having the lowest number of allocated bytes tokens over a duration of time corresponds to the work item that is next to be admitted to the LSM tree.

In some embodiments, dynamic byte token estimation may be used to estimate a capacity of the LSM tree, which can be used to admit work items from the admission queue as described herein. When the LSM tree of the storage layer is healthy (e.g., not overloaded), byte tokens may generated and made readily available (e.g., unlimited) for work items and the work items may be continuously admitted to the LSM tree (e.g., by the storage engine) as they are received by the storage layer from the replication layer. In some cases, a read amplification factor for an LSM tree can be used to determine a health of the LSM tree-based storage layer. The storage engine of the storage layer can use a numerical (e.g., positive integer) read amplification threshold (referred to as "$R_{amp}$" or a "threshold number of levels") to determine when to use an admission queue to limit admission of work items to the LSM tree. The read amplification threshold $R_{amp}$ may be compared to a read amplification factor for a sum of a number of memtables included in the LSM tree and a number of levels (e.g., horizontal levels corresponding to SST files) included in a vertical section of the LSM tree. In some cases, the number of levels included in a vertical section of the LSM tree may be equivalent to a number of vertically disposed, horizontal lower levels (e.g., L1-L6) of the LSM tree and a number of vertically disposed, horizontal sub-levels included in a top level (e.g., L0) of the LSM tree. The number of levels included in a vertical section of the LSM tree may be based on a number of vertically disposed, horizontal files (e.g., SST files) in a vertical section of the LSM tree, where L0 may include one or more vertically disposed, horizontal sub-levels each including one or more files per horizontal section and each of the other levels (e.g., L1-L6) of the LSM tree may include one or more files per horizontal section. As an example, the LSM tree shown and described with respect to FIG. 5 includes one memtable and three sub-levels in L0, such that the LSM tree includes ten vertically disposed, horizontal levels in a vertical section of the LSM tree (assuming L1-L6 each include one level of SST file(s)). The read amplification threshold $R_{amp}$ can be any suitable value including, for example, a value within a range of 8-30 such as 8, 9, 10, 12, 14, 16, 20, 24, etc. As an example, for a read amplification threshold of 8 (e.g., $R_{amp}$=8), an LSM tree including one memtable, seven levels (e.g., L0-L6) each including an SST, and three sub-levels included in L0 each including an SST may exceed $R_{amp}$ based on the number of vertical levels of the LSM tree (e.g., ten vertical levels) being greater than $R_{amp}$ (e.g., eight vertical levels).

In some embodiments, when the read amplification threshold $R_{amp}$ is exceeded (e.g., such that the LSM tree is considered to be overloaded), the storage engine may limit admission to the LSM tree via an admission queue. The storage engine may limit admission using byte tokens generated by the storage engine and consumed by work items for admission to the LSM tree as described herein. A byte token may correspond to a compressed or uncompressed byte of data written, read, and/or otherwise operated on by a work item. The byte tokens generated by the storage engine may be indicative of and/or otherwise estimate a number of work items that may be acceptably admitted to the LSM tree based on the capacity of the LSM tree. To generate byte tokens, the storage engine may estimate the capacity of the LSM tree and the size of the work items to be admitted to the LSM tree. Based on estimating the capacity of the LSM tree and the size of the work items to be admitted to the LSM tree, the storage engine may determine a rate (e.g., consumption rate) at which work items consume byte tokens for admission to the LSM tree.

In some embodiments, the storage engine may estimate the capacity of the LSM tree by determining a rate and/or a number of bytes compacted from L0 to lower levels of the LSM tree. Based on determining a rate and/or a number of bytes compacted from L0 to lower levels of the LSM tree, the storage engine may determine a rate for generating compaction byte tokens and/or generate a number of compaction byte tokens, where the rate and/or number of compaction byte tokens are based on the determined rate and/or number of bytes compacted from L0 to lower levels of the LSM tree. In some cases, the storage engine can estimate the capacity of the LSM tree by determining a rate (e.g., flush rate) and/or a number of bytes flushed from a memtable to L0 of the LSM tree. In some cases, the storage engine may estimate a flush bandwidth, which may be a rate (e.g., bytes per second) at which data can be flushed from a memtable to L0 of an LSM tree. Based on determining a flush bandwidth (also referred to as a "flush rate") and/or a number of bytes flushed from a memtable to L0 of the LSM tree, the storage engine may determine a rate for generating flush byte tokens and/or generate a number of flush byte tokens, where the rate and/or number of flush byte tokens are based on the determined rate and/or number of bytes compacted from L0 to lower levels of the LSM tree. The storage engine may select the lower (e.g., minimum) determined rate and/or generated number of the compaction byte tokens and the flush byte tokens to be indicative of and/or an estimate of the available capacity of the LSM tree, where the indication or estimation of the available capacity of the LSM tree can be used to determine a rate at which to generate byte tokens (and thereby cause admission of work items to the LSM tree). As an example, the lower of the generation rates for the compaction byte tokens and the flush byte tokens may be used to determine the rate at which to generate byte tokens.

In some embodiments, to determine a size of the work items to be admitted to the LSM tree (e.g., for determining a consumption rate at which work items consume byte tokens for admission to the LSM tree), the storage engine can determine a number and/or a rate of bytes (e.g., bytes per work item) admitted to the LSM tree for the work items. In some cases, the storage engine may determine an average number of bytes added per work item admitted to the LSM tree. The average number of bytes added per work item admitted to the LSM tree may be determined based on historical work item admission information. Historical work item admission information may include a dataset including a number of work items previously admitted to the LSM tree, the respective size (e.g., number of bytes) of each of the work items, and a respective timestamp corresponding to each of the work items (e.g., corresponding to the tuples of the work items). Historical work item information may include data collected within a particular time period (e.g., the last month, 6 months, 1 year, etc.).

In some embodiments, to determine a size of work items to be admitted to the LSM tree, the storage engine may query and/or determine an amount (e.g., size) of data to be written by at least one (e.g., one or more) of the work items stored in the admission queue. The amount of data to be written by a work item can be indicative of a number of byte tokens the work item would consume during admission to the LSM tree. The storage engine may determine a consumption rate for byte tokens based on the estimated capacity of the LSM tree and/or a size of the work items to be admitted. As described herein, the determined size of the work items to be admitted may be based on (e.g., equivalent to) the average number of bytes added (e.g., written) per work item previously admitted to the LSM tree and/or the amount of data to be added (e.g., written) by at least one work item included in the admission queue.

In some embodiments, based on for the determined values for the capacity of the LSM tree, the size of work items to be admitted to the LSM tree, and/or the rate (e.g., consumption rate) at which work items consume byte tokens (e.g., according to the size of the work items) for admission to the LSM tree, the storage engine can determine a byte token generation rate used to generate byte tokens. As described herein, the determined capacity of the LSM tree can be based on the minimum determined generation rate and/or number of the compaction byte tokens and flush byte tokens. In some cases, the storage engine may periodically determine (e.g., redetermine or recompute) the byte token generation rate based on updated parameters and/or metrics for the capacity of the LSM tree and/or the rate (e.g., consumption rate) at which work items consume byte tokens for admission to the LSM tree. For example, the storage engine may redetermine a byte token generation rate as described herein every 1 second, 10 seconds, 15 seconds, 30 seconds, 1 minute, 5 minutes, etc. The duration used to periodically determine the byte token generation rate may be based on experimental observations of compaction durations in L0 of the LSM tree when L0 includes a high number (e.g., greater than a threshold number) of sub-levels. As an example, compactions may last for a duration of approximately 5-10 seconds, such that the byte token generation rate may be redetermined every 15 seconds. In some cases, the periodic duration for redetermining the byte token generation rate should be significantly larger than most compactions, but not too large (e.g., for responsiveness). Other durations to periodically determine the byte token generation rate may be used by the admission queue.

In some embodiments, based on periodically determining the byte token generation rate, the storage engine may periodically generate a number of bytes tokens based on (e.g., according to) the byte token generation rate and may make the generated byte tokens available to the admission queue for admitting work items to the LSM tree. Bytes tokens may be generated and made available at periodic intervals (e.g., every second, 3 seconds, 10 seconds, etc.) of any suitable duration. For example, the storage engine may generate and make byte tokens available to the admission queue every second to admit work items to the LSM tree. Other durations to periodically generate byte tokens may be used by the storage engine. Byte tokens may be periodically generated in smaller (e.g., shorter) intervals relative to the periodic intervals for determining byte token generation rates. Periodically generating byte tokens at intervals (e.g., 1 second intervals) less than the interval (e.g., 1 minute or 15 second intervals) corresponding to determining byte token generation rates may prevent instances where lower priority work items consume available byte tokens ahead of higher priority work items that arrive in the admission queue shortly after the consumption. As an example, based on determining a byte token generation rate to be 120 byte tokens per minute, rather than generating and releasing 120 byte tokens at 1 minute intervals (e.g., corresponding to determining the byte token generation rate), 2 byte tokens may be generated and made available at 1 second intervals. This can prevent an instance, for example, where a burst of lower priority work items consumes all available byte tokens at the start of a 1 minute time interval and more important work arriving 1 second later has to wait for 59 seconds until new byte tokens are generated and made available.

In some embodiments, based on byte tokens being made available for consumption by work items in the admission queue, a work item ordered next for admission to the LSM tree from the admission queue may consume one or more byte tokens (e.g., based on the size of the work of the item) and may be admitted to the LSM tree. A single work item may consume more than one byte token (e.g., based on the amount of data to be written by the work item) to be admitted to the LSM tree. A work item can determine and provide an indication of a number of byte tokens required for consumption and an executed work item can provide an indication of a number of bytes were ingested into L0 of the LSM tree, such that byte token consumption rates (e.g., used to determine the byte token generation rate) can be adjusted.

In some embodiments, a node may execute an admission control I/O protocol for admission of work items to an LSM tree. FIG. 7 shows a flowchart for an exemplary method 700 for queuing and admitting work items to an LSM tree. The method 700 may be performed by a node (e.g., node 120) based on received communications (e.g., transactional operations) from one or more client devices (e.g., client device 106a, client device 106b, etc.). A result of the method 700 may include admitting work items to write to memtables and/or SST files included in an LSM tree. For simplicity, the following paragraphs describe the method 700 with reference to admission of a single work item from a number of work items. However, one of ordinary skill in the art will appreciate that the steps 702-710 of the method 700 may be performed for a number of work items in parallel by a number of nodes for transactional operations directed to the data stored by the nodes.

At step 702, a node may receive, at an admission queue configured to control admission to an LSM tree stored at the node comprising part or all of a data storage system, a number of work items each corresponding to a respective tuple of a number of tuples, where the LSM tree includes a number of levels. The number of work items may be derived from one or more transactions received from one or more client devices, where the one or more transactions are decomposed into the number of work items. Each of the number of work items may be configured to perform write operations on KV data stored in the LSM tree (e.g., in memtables and/or SST files). The number of levels may include one or more memtables, one or more sub-levels of L0, and L1-L6, where the sub-levels of L0 and L1-L6 each include one or more SST files. Each of L0-L6 may include a subset of a number of SST files including sorted KV data. The one or more memtables may be written to by admitted work items and may transfer data written by the work items to L0. The number of work items may originate from write operations (e.g., included in received transactions) directed to KV data stored in the LSM tree. Each work item may include or otherwise correspond to a tuple of the number of tuples. Each tuple may include (i) a priority indicator corresponding to a particular tenant of one or more tenants of the data storage system that initiated the respective work item, (ii) a tenant identifier indicative of the particular tenant, and/or (iii) a timestamp (e.g., write timestamp of the transaction corresponding to the work item). In some cases, the number of the levels of the LSM tree is based on a sum of a number of memtables included in the LSM tree and a number of SST files included in a vertical section of the LSM tree. The node may determine a number of the levels of the LSM tree (e.g., as a read amplification factor as described herein) and compare the number of the levels of the LSM tree to the threshold number of levels (e.g., a read amplification threshold).

At step 704, the node may queue each of the number of work items in the admission queue for execution at the LSM tree based on the number of tuples. The node may continuously receive work items based on receiving transactional operations including the work items at the node. In some cases, queuing the number of work items may include ordering each work item of the number of work items in the admission queue based on the respective priority indicator and the respective timestamp corresponding to each work item in the number of work items. The work items may be queued in FIFO order according to the timestamps of the work items. Work items corresponding to the same tenant (e.g., indicated by the tenant identifier) may be queued based on the priority indicator corresponding to the work items. The work items corresponding to the same tenant and having the same timestamp may be queued such that higher priority work items are queued for admission to the LSM tree before lower priority work items as described herein. In some cases, queuing the number of work items may include ordering each of the tenants (e.g., two or more tenants) corresponding to the number of work items based on a number of previous tokens consumed by a number of historical work items previously admitted to the LSM tree at the node, where the number of historical work items correspond to the tenants. In some cases, queuing the number of work items may include ordering each of the number of work items in the admission queue based on the ordering of the tenants, where first work items corresponding to a first tenant having a smaller number or size of historical work items admitted to the LSM tree are ordered for admission to the LSM tree before second work items corresponding to a second tenant having a larger number or size of historical work items admitted to the LSM tree over a particular duration of time.

At step 706, the node may determine (i) an indication of a capacity of the LSM tree and (ii) an indication of a size of each work item of the number of work items. The node may determine the indication of the capacity of the LSM tree and/or the indication of the size of each work item when a number of the levels of the LSM tree exceeds a threshold number of levels. In some cases, determining the indication of the capacity of the LSM tree is based on at least one of: (i) an amount of data compacted from a level of the one or more levels of the LSM tree or (ii) an amount of data flushed from a memory table to the LSM tree, such that the capacity of the LSM tree is estimated based on compaction rates and/or flush rates as described herein. In some cases, determining the indication of the size of each work item of the number of work items is based on at least one of: (i) an indication of an average amount of data added to the LSM tree by a number of historical work items previously admitted to the LSM tree and/or (ii) a size of data to be added (e.g., written) by at least one work item of the number of work items.

At step 708, the node may generate a number of tokens (e.g., byte tokens) configured to enable admission of at least one of the number of work items to the LSM tree based on the indication of the capacity of the LSM tree and the indication of the size of each work item of the number of work items. The node may determine a generation rate for the number of tokens as described herein based on the indication of the capacity of the LSM tree and/or the indication of the size of each work item of the number of work items. In some cases, generating the number of tokens may include periodically generating, at the generation rate, a subset of the number of tokens.

At step 710, the node may admit, based on an availability of the number of tokens, a work item of the number of work items from the admission queue to the LSM tree. Admission of the work item may further include (ii) the work item consuming at least one token of the subset of the number of tokens and (ii) the work item writing at least one value to a memory table of the LSM tree. Admission of the work item may include executing the work item at a memtable or SST file of the LSM tree. For example, the work item may write a value to a particular key at a memtable included in the LSM tree. In some cases, admission of the work item of the number of work items from the admission queue to the LSM tree corresponds to consumption of at least one of the number of tokens, thereby reducing the number of tokens available to admit other work items from the number of work items. For admission from the admission queue to the LSM tree, a work item may consume a number of tokens based on the size of the work item. The work item may be configured to write data to the one or more memory tables included in the LSM tree, where the one or more memory tables are configured to transfer the data written by the work item to a subset of the number of SST files included in L0.

Further Description of Some Embodiments

Figure 8:
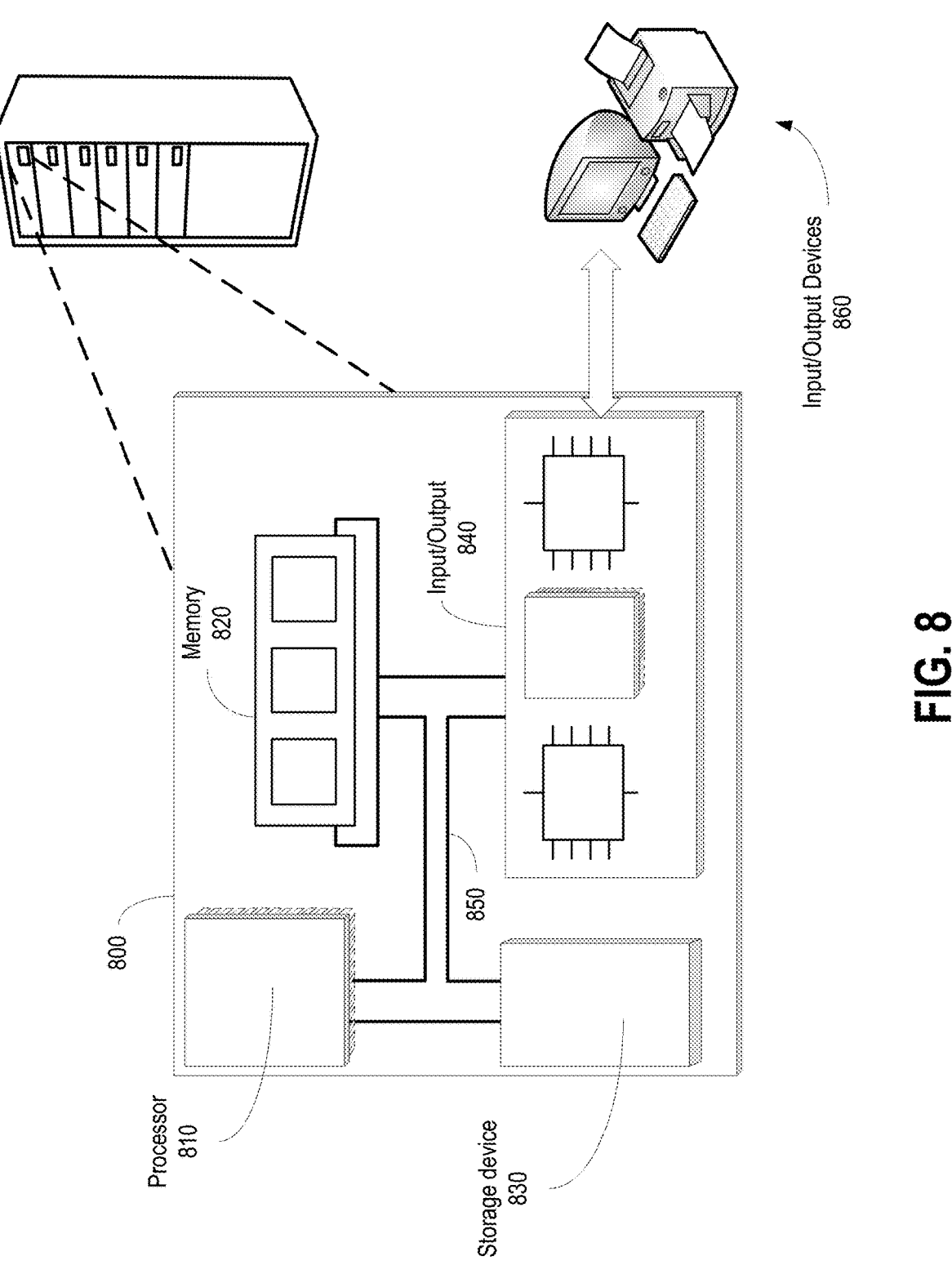
FIG. 8 is a block diagram of an example computer system, according to some embodiments.

FIG. 8 is a block diagram of an example computer system 800 that may be used in implementing the technology described in this document. General-purpose computers, network appliances, mobile devices, or other electronic systems may also include at least portions of the system 800. The system 800 includes a processor 810, a memory 820, a storage device 830, and an input/output device 840. Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for controlling admission of transactional operations to a log-structured merge (LSM) tree operated by a computing device of a plurality of computing devices, the method comprising:
   receiving, from one or more of the plurality of computing devices at an admission queue operated by the computing device and configured to control admission to the LSM tree, a plurality of work items configured to write to the LSM tree, wherein each of the work items corresponds to a respective tuple of a plurality of tuples, and wherein the LSM tree comprises a plurality of levels;
   queueing, by the computing device, each of the plurality of work items in the admission queue, the plurality of work items being ordered in the admission queue for execution based on the plurality of tuples;
   determining a read amplification factor of the LSM tree, wherein the read amplification factor is based on a number of files included in a vertical section of the LSM tree;
   when the read amplification factor of the LSM tree exceeds a threshold read amplification value, determining, by the computing device, (i) an indication of a capacity of the LSM tree and (ii) an indication of a size of each work item of the plurality of work items;
   generating, by the computing device, a plurality of tokens configured to enable admission of the plurality of work items from the admission queue to the LSM tree based on the indication of the capacity of the LSM tree and the indication of the size of each work item of the plurality of work items; and admitting, by the computing device and based on the plurality of tokens, a work item of the plurality of work items from the admission queue to the LSM tree by:
      consuming, by the work item, at least one token of the plurality of tokens; and
      executing the work item by writing at least one value to a memory table of the LSM tree, wherein the memory table is stored by a computer-readable storage medium of the computing device.

2. The method of claim 1, wherein the plurality of levels comprises a plurality of sorted-string table (SST) files.

3. The method of claim 2, wherein the plurality of levels comprise one or more memory tables comprising the memory table, wherein the work item is configured to write data to the memory table, and wherein the memory table is configured to transfer the data written by the work item to the plurality of SST files.

4. The method of claim 1, wherein the plurality of work items corresponds to write operations directed to key-value (KV) data stored in the LSM tree.

5. The method of claim 1, wherein each tuple of the plurality of tuples comprises (i) a priority indicator, (ii) a tenant identifier indicative of a tenant of one or more tenants of a data storage system that corresponds to the respective work item, and (iii) a timestamp.

6. The method of claim 5, wherein the queueing each of the plurality of work items in the admission queue further comprises:
   ordering each of the plurality of work items in the admission queue based on the respective priority indicator and the respective timestamp corresponding to each work item in the plurality of work items.

7. The method of claim 5, wherein the one or more tenants comprise two or more tenants, and wherein the queueing each of the plurality of work items in the admission queue further comprises:
   ordering each of the two or more tenants corresponding to the plurality of work items based on a number of previous tokens consumed by a plurality of historical work items previously admitted to the LSM tree, wherein the plurality of historical work items correspond to the two or more tenants; and
   ordering each of the plurality of work items in the admission queue based on the ordering of the two or more tenants.

8. The method of claim 1, further comprising:
   comparing the read amplification factor of the LSM tree to the threshold read amplification value.

9. The method of claim 1, wherein the determining the indication of the capacity of the LSM tree by determining: (i) an amount of data compacted from a level of the plurality of levels of the LSM tree or (ii) an amount of data flushed from a second memory table of the LSM tree.

10. The method of claim 1, wherein the determining the indication of the size of each work item of the plurality of work items is based on at least one of: (i) an indication of an average amount of data corresponding to a plurality of historical work items previously admitted to the LSM tree or (ii) a size of data to be written by at least one work item of the plurality of work items.

11. The method of claim 1, further comprising:
   determining a generation rate for the plurality of tokens based on the indication of the capacity of the LSM tree and the indication of the size of each work item of the plurality of work items.

12. The method of claim 11, wherein the generating the plurality of tokens further comprises:

periodically generating, at the generation rate, a subset of the plurality of tokens.

13. A system for controlling admission of transactional operations to a log-structured merge (LSM) tree operated by the system, the system comprising:

one or more processors;

a computer-readable storage medium configured to store a memory table of the LSM tree; and a memory storing computer-executable instructions that, when executed by the one or more processors, program the one or more processors to perform operations comprising:

receiving, from one or more of a plurality of computing devices at an admission queue operated by the system and configured to control admission to the LSM tree, a plurality of work items configured to write to the LSM tree, wherein each of the work items corresponds to a respective tuple of a plurality of tuples, and wherein the LSM tree comprises a plurality of levels;

queueing each of the plurality of work items in the admission queue, the plurality of work items being ordered in the admission queue for execution based on the plurality of tuples;

determining a read amplification factor of the LSM tree, wherein the read amplification factor is based on a number of files included in a vertical section of the LSM tree;

when the read amplification factor of the LSM tree exceeds a threshold read amplification value, determining (i) an indication of a capacity of the LSM tree and (ii) an indication of a size of each work item of the plurality of work items;

generating a plurality of tokens configured to enable admission of the plurality of work items from the admission queue to the LSM tree based on the indication of the capacity of the LSM tree and the indication of the size of each work item of the plurality of work items; and admitting, based on the plurality of tokens, a work item of the plurality of work items from the admission queue to the LSM tree by:

consuming, by the work item, at least one token of the plurality of tokens; and executing the work item by writing at least one value to the memory table.

14. The system of claim 13, wherein the plurality of levels comprises a plurality of sorted-string table (SST) files.

15. The system of claim 14, wherein the plurality of levels comprise one or more memory tables comprising the memory table, wherein the work item is configured to write data to the memory table, and wherein the memory table is configured to transfer the data written by the work item to the plurality of SST files.

16. The system of claim 13, wherein the plurality of work items corresponds to write operations directed to key-value (KV) data stored in the LSM tree.

17. The system of claim 13, wherein each tuple of the plurality of tuples comprises (i) a priority indicator, (ii) a tenant identifier indicative of a tenant of one or more tenants of a data storage system that corresponds to the respective work item, and (iii) a timestamp.

18. The system of claim 17, wherein the queueing each of the plurality of work items in the admission queue further comprises:

ordering each of the plurality of work items in the admission queue based on the respective priority indicator and the respective timestamp corresponding to each work item in the plurality of work items.

* * * * *